US012766855B2

(12) United States Patent
Takeda et al.

(10) Patent No.: US 12,766,855 B2
(45) Date of Patent: Oct. 20, 2026

(54) COMPENSATION COEFFICIENT DETERMINATION METHOD AND PRINTING METHOD

(71) Applicant: SCREEN Holdings Co., Ltd., Kyoto (JP)

(72) Inventors: Kazuya Takeda, Kyoto (JP); Keiji Hatano, Kyoto (JP); Kenichi Yokouchi, Kyoto (JP); Takaharu Yamamoto, Kyoto (JP); Yusaku Ikeda, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 180 days.

(21) Appl. No.: 18/912,864

(22) Filed: Oct. 11, 2024

(65) Prior Publication Data

US 2025/0121609 A1 Apr. 17, 2025

(30) Foreign Application Priority Data

Oct. 16, 2023 (JP) ................................ 2023-178215

(51) Int. Cl.

| | |
|---|---|
| ***B41J 2/045*** | (2006.01) |
| ***B41J 2/165*** | (2006.01) |
| ***B41J 2/21*** | (2006.01) |

(52) U.S. Cl.

CPC ........... *B41J 2/2139* (2013.01); *B41J 2/2142* (2013.01)

(58) Field of Classification Search

CPC .... B41J 2/0451; B41J 2/16579; B41J 2/2132; B41J 2/2142

See application file for complete search history.

(56) References Cited

U.S. PATENT DOCUMENTS

| | | | | |
|---|---|---|---|---|
| 11,368,592 | B1 | 6/2022 | Kailey et al. | |
| 2011/0234673 | A1 * | 9/2011 | Ueshima | B41J 2/2139 347/14 |
| 2013/0215178 | A1 * | 8/2013 | Ueshima | B41J 2/12 347/14 |
| 2024/0075735 | A1 * | 3/2024 | Asakura | B41J 2/2146 |

FOREIGN PATENT DOCUMENTS

| | | |
|---|---|---|
| JP | 2022-136042 A | 9/2022 |

* cited by examiner

*Primary Examiner* — Scott A Richmond
(74) *Attorney, Agent, or Firm* — Rimon P.C.

(57) ABSTRACT

A tentative defective nozzle is set for each of K comparison regions associated with K provisional compensation coefficients different from each other. K pieces of sample image data are extracted from a captured image of a compensation coefficient calculation chart obtained by performing an ink amount compensation process on predetermined image data while applying the K provisional compensation coefficients to the K comparison regions. A function representing a correspondence relationship between a coefficient value and a luminance difference between a measured luminance value and a target luminance value is generated based on the K pieces of sample image data. A compensation coefficient to be actually applied to the ink amount compensation process is calculated using the function.

14 Claims, 32 Drawing Sheets

COMPENSATION COEFFICIENT DETERMINATION METHOD AND PRINTING METHOD

BACKGROUND OF THE INVENTION

Field of the Invention

The present invention relates to an inkjet printing apparatus, and more particularly to a technique for controlling an ejection amount of ink so as not to cause a defect in a print image even if a nozzle in an ejection defect state (hereinafter, referred to as an "ejection defect nozzle") is present.

Description of Related Art

An inkjet printing apparatus that performs printing by ejecting ink onto a print medium such as printing paper is widely known. In the inkjet printing apparatus, drying of the ink due to evaporation of a solvent in the vicinity of a nozzle, mixing of air bubbles into the nozzle, adhesion of dust to the nozzle, and the like may occur. That is, ejection defects of the nozzle may occur.

The ejection defects of a nozzle can be roughly classified into three types, which will be described with reference to FIGS. 39 to 41. Note that each of FIGS. 39 to 41 illustrates a part of a print image obtained by printing a stepwise regular pattern (test pattern), and a black shaded portion is a portion where ink is applied. In a dotted line portion denoted by reference sign 91 in FIG. 39, no ink is applied to a portion where ink is to be applied. Hereinafter, such ejection defects are referred to as "non-ejection". In a dotted line portion denoted by reference sign 92 in FIG. 40, a shape of the portion where the ink is applied is different from the original shape. Hereinafter, such ejection defects are referred to as "shape defects". The shape defects also include ejection defects in a blurred state due to insufficient density and ejection defects in a state in which a portion where ink is applied spreads in a main scanning direction (direction orthogonal to a conveyance direction of the printing paper). In a dotted line portion denoted by reference sign 93 in FIG. 41, ink is applied to a portion shifted in the main scanning direction from the portion where the ink is originally to be applied. Hereinafter, such ejection defects are referred to as "side skipping".

When the ejection defects as described above occur in the inkjet printing apparatus, a defect of the print image such as a white streak or a dot missing occurs. Therefore, conventionally, an operation (cleaning or flushing) for recovering the function of an ejection defect nozzle and an alternative droplet ejection in which ink droplets to be ejected by the ejection defect nozzle are ejected by a peripheral nozzle are performed.

A print head includes a large number of nozzles, and an ejection amount of ink among a plurality of nozzles varies even if the ejection defects as described above do not occur. Furthermore, since the characteristics are different for each print head, the ejection amount of ink varies among a plurality of the print heads. The variation in the ejection amount of ink causes density unevenness of the print image. Therefore, conventionally, a shading correction process of compensating for such variation in the ejection amount of ink is performed on print data.

Note that, for example Japanese Laid-Open Patent Publication No. 2022-136042 discloses, a technique for controlling the ejection amount of ink by performing the above-described alternative droplet ejection and shading correction process.

Japanese Laid-Open Patent Publication No. 2022-136042 describes generating a uniformity compensated transfer function (a function for performing the shading correction process), generating a missing neighbor corrected transfer function (a function for performing the alternative droplet ejection), generating a missing neighbor transfer function based on the uniformity compensated transfer function and the missing neighbor corrected transfer function, and the like, but does not describe how to obtain each transfer function in detail. Therefore, according to a printing system described in Japanese Laid-Open Patent Publication No. 2022-136042, even if an effect of correcting jet-out conditions (ejection defect state) in real time is obtained, the defect of the print image is not accurately corrected when the ejection defect nozzle is present unless each transfer function is appropriately determined. That is, a good printed matter may not be obtained.

SUMMARY OF THE INVENTION

Therefore, an object of the present invention is to enable more accurate correction of a defect of a print image in a case where an ejection defect nozzle is present than before, regarding an inkjet printing apparatus.

One aspect of the present invention is directed to a compensation coefficient determination method of determining a compensation coefficient to be applied to an ink amount compensation process that compensates for an amount of ink ejected to a print medium when a nozzle in an ejection defect state is present in a printing apparatus including a plurality of nozzles that ejects ink to the print medium, the compensation coefficient determination method including:

- setting a plurality of divided regions including K comparison regions associated with K provisional compensation coefficients different from each other and a normal region that is not affected by a tentative defective nozzle that is virtually considered to be in an ejection defect state, K being an integer of 2 or more;
- setting the tentative defective nozzle for each of the K comparison regions;
- generating compensation coefficient calculation chart data representing a compensation coefficient calculation chart for determining the compensation coefficient by performing the ink amount compensation process on predetermined image data having a constant density while applying the K provisional compensation coefficients to the K comparison regions;
- printing the compensation coefficient calculation chart by ejecting ink from the plurality of nozzles based on the compensation coefficient calculation chart data;
- acquiring imaging data that is data of a luminance value by imaging the compensation coefficient calculation chart;
- extracting, from the imaging data, K pieces of sample image data each including data of one or more luminance values and normal region data that is data of a luminance value corresponding to the normal region, the K pieces of sample image data being data corresponding to the K comparison regions, respectively, and corresponding to a position of the tentative defective nozzle;
- generating a function representing a correspondence relationship between coefficient values and luminance differences between a luminance value in the sample image data and a luminance value in the normal region data based on the K pieces of sample image data and the normal region data, the coefficient values including the K provisional compensation coefficients; and calculating the compensation coefficient using the function.

According to such a configuration, the function representing a correspondence relationship between the coefficient values including the K provisional compensation coefficients and the luminance differences between the measured luminance value (luminance value in the sample image data) and the target luminance value (luminance value in the normal region data) is obtained based on the data obtained by applying the K (K is an integer of 2 or more) provisional compensation coefficients to the ink amount compensation process. Then, the compensation coefficient actually applied to the ink amount compensation process is obtained using the function. Thus, the compensation coefficient actually applied to the ink amount compensation process is determined using the function based on the data obtained by applying the provisional compensation coefficient to the ink amount compensation process. Therefore, a suitable compensation coefficient is obtained. From the above, with respect to a printing apparatus that performs printing by ejecting ink from a nozzle, a defect of a print image in a case where an ejection defect nozzle is present is corrected with higher accuracy than before. Furthermore, since the defect of the print image is accurately corrected, the necessity of reprinting is reduced. As a result, wasteful consumption of ink and print media is reduced, so that it can contribute to the achievement of SDGs (sustainable development goals).

Another aspect of the present invention is directed to a printing method using a printing apparatus including a plurality of nozzles that ejects ink to a print medium, the printing method including:

determining a compensation coefficient to be applied to an ink amount compensation process that compensates for an amount of ink ejected to the print medium when a nozzle in an ejection defect state is present in the printing apparatus;

generating step of generating shading data to be used in a shading correction process that compensates for variation in an ejection amount of ink among the plurality of nozzles;

correcting step of correcting the shading data by performing the ink amount compensation process on the shading data using the compensation coefficient;

generating print data by performing a rasterization process on submission data;

correcting the print data by performing the shading correction process on the print data using corrected shading data;

generating halftone image data by performing a halftone process on corrected print data; and ejecting ink from the plurality of nozzles based on the halftone image data, wherein determining a compensation coefficient includes:

setting a plurality of divided regions including K comparison regions associated with K provisional compensation coefficients different from each other and a normal region that is not affected by a tentative defective nozzle that is virtually considered to be in an ejection defect state, K being an integer of 2 or more;

setting the tentative defective nozzle for each of the K comparison regions;

generating compensation coefficient calculation chart data representing a compensation coefficient calculation chart for determining the compensation coefficient by performing the ink amount compensation process on predetermined image data having a constant density while applying the K provisional compensation coefficients to the K comparison regions;

printing the compensation coefficient calculation chart by ejecting ink from the plurality of nozzles based on the compensation coefficient calculation chart data;

acquiring imaging data that is data of a luminance value by imaging the compensation coefficient calculation chart;

extracting, from the imaging data, K pieces of sample image data each including data of one or more luminance values and normal region data that is data of a luminance value corresponding to the normal region, the K pieces of sample image data being data corresponding to the K comparison regions, respectively, and corresponding to a position of the tentative defective nozzle;

generating a function representing a correspondence relationship between coefficient values and luminance differences between a luminance value in the sample image data and a luminance value in the normal region data based on the K pieces of sample image data and the normal region data, the coefficient values including the K provisional compensation coefficients; and calculating the compensation coefficient using the function.

According to such a configuration, since the ink amount compensation process is performed on the shading data, by correcting the print data using the corrected shading data, not only the occurrence of the defect of the print image due to the presence of the ejection defect nozzle but also the occurrence of the density unevenness due to the variation in the ejection amount of the ink among the plurality of nozzles can be suppressed.

Still another aspect of the present invention is directed to a compensation coefficient determination method of determining a compensation coefficient to be applied to an ink amount compensation process that compensates for an amount of ink ejected to a print medium when a nozzle in an ejection defect state is present in a printing apparatus including a plurality of nozzles that ejects ink to the print medium, the compensation coefficient determination method including:

printing a compensation coefficient calculation chart for determining the compensation coefficient by ejecting ink from the plurality of nozzles, in a state where a plurality of divided regions including K comparison regions associated with K provisional compensation coefficients different from each other and respectively corresponding to a tentative defective nozzle that is virtually set in an ejection defect state and a normal region that is not affected by the tentative defective nozzle is set, based on compensation coefficient calculation chart data obtained by performing the ink amount compensation process on predetermined image data having a constant density while applying the K provisional compensation coefficients to the K comparison regions, K being an integer of 2 or more;

acquiring imaging data that is data of a luminance value by imaging the compensation coefficient calculation chart;

extracting, from the imaging data, K pieces of sample image data each including data of one or more luminance values and normal region data that is data of a luminance value corresponding to the normal region, the K pieces of sample image data being data corresponding to the K comparison regions, respectively, and corresponding to a position of the tentative defective nozzle;

generating a function representing a correspondence relationship between coefficient values and luminance differences between a luminance value in the sample image data and a luminance value in the normal region data based on the K pieces of sample image data and the normal region data, the coefficient values including the K provisional compensation coefficients; and calculating the compensation coefficient using the function.

These and other objects, features, modes, and advantageous effects of the present invention will become more apparent from the following detailed description of the present invention with reference to the accompanying drawings.

DETAILED DESCRIPTION OF PREFERRED EMBODIMENTS

Hereinafter, an embodiment of the present invention will be described with reference to the accompanying drawings.

1. Overall Configuration of Printing System

Figure 1:
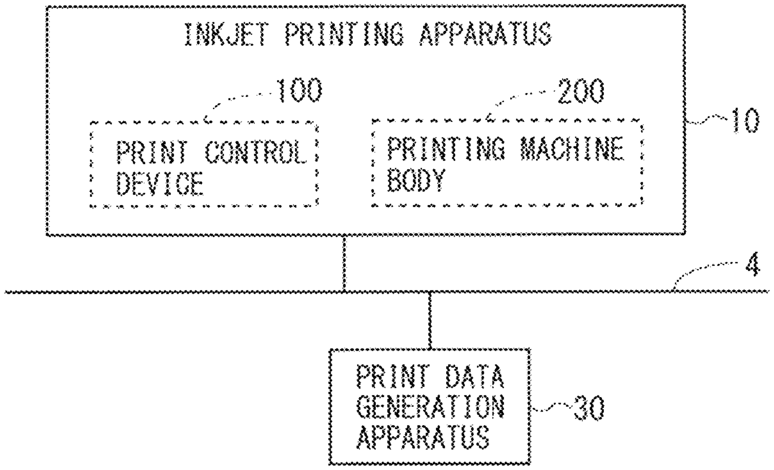
FIG. 1 is an overall configuration diagram of a printing system according to an embodiment of the present invention.

FIG. 1 is an overall configuration diagram of a printing system according to an embodiment of the present invention. The printing system includes an inkjet printing apparatus 10 and a print data generation apparatus 30. The inkjet printing apparatus 10 and the print data generation apparatus 30 are connected to each other by a LAN 4. The print data generation apparatus 30 generates print data by performing a rasterization process or the like on submitted data such as a PDF file. This print data is data not subjected to a halftone process, and the halftone process is performed by a print control device 100 in the inkjet printing apparatus 10 as described later. The print data generated by the print data generation apparatus 30 is transmitted to the inkjet printing apparatus 10 via the LAN 4. The inkjet printing apparatus 10 includes a printing machine body 200 and the print control device 100 that controls an operation of the printing machine body 200. The inkjet printing apparatus 10 outputs a print image on printing paper as a print medium based on print data transmitted from the print data generation apparatus 30 without using a printing plate. Note that the present invention can also be applied to a case where a print medium (for example, a film) other than the printing paper is used.

2. Configuration of Printing Machine Body of Inkjet Printing Apparatus

Figure 2:
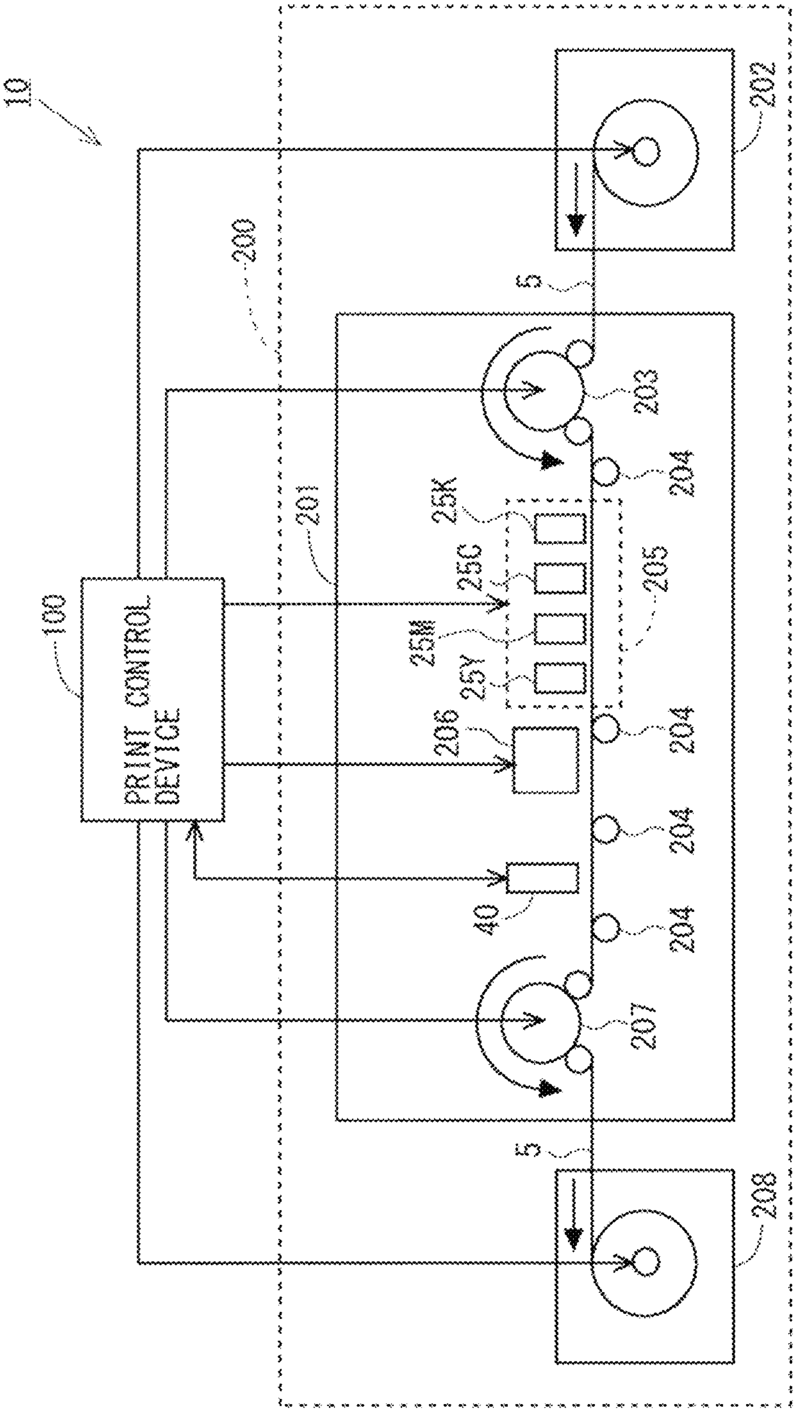
FIG. 2 is a schematic diagram illustrating one configuration example of an inkjet printing apparatus in the embodiment.

FIG. 2 is a schematic diagram one illustrating configuration example of the inkjet printing apparatus 10. As described above, the inkjet printing apparatus 10 includes the print control device 100 and the printing machine body 200.

The printing machine body 200 includes a paper feeding unit 202 that supplies printing paper (in this example, rolled printing paper) 5 to a printing mechanism 201, the printing mechanism 201 that performs printing on the printing paper 5, and a paper winding unit 208 that winds the printing paper 5 after printing in a roll form.

The printing mechanism 201 includes a first drive roller 203 for conveying the printing paper 5 to the inside, a plurality of support rollers 204 for conveying the printing paper 5 inside the printing mechanism 201, a recording unit 205 that records a print image on the printing paper 5, a drying mechanism 206 that dries the printing paper 5 on which the print image is recorded, and a second drive roller 207 for outputting the printing paper 5 from the inside of the printing mechanism 201. The recording unit 205 includes a K color head unit 25K that ejects K color (black) ink, a C color head unit 25C that ejects C color (cyan) ink, an M color head unit 25M that ejects M color (magenta) ink, and a Y color head unit 25Y that ejects Y color (yellow) ink. Furthermore, the printing mechanism 201 includes an inline scanner 40 as an imaging device that images a print image recorded on the printing paper 5 by the recording unit 205. Imaging data obtained by imaging the print image by the inline scanner 40 is sent to the print control device 100. Note that, in the following description, in a case where the color of the ink ejected from the head unit is not distinguished, the head unit is denoted by reference sign 25.

Figure 3:
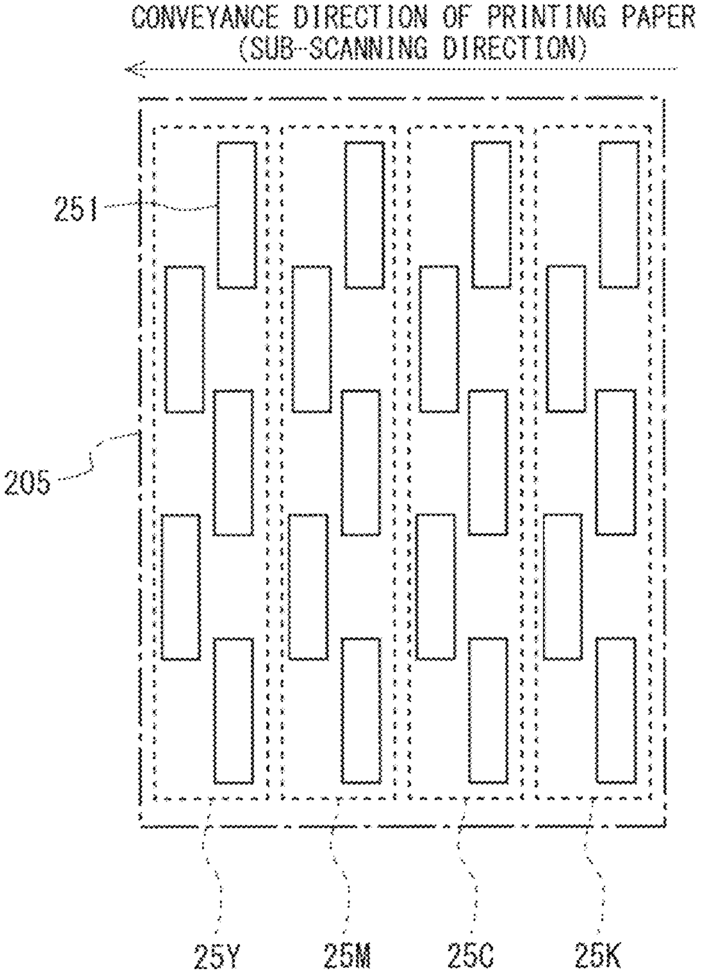
FIG. 3 is a plan view illustrating a configuration example of a recording unit in the embodiment.

FIG. 3 is a plan view illustrating a configuration example of the recording unit 205. As illustrated in FIG. 3, the recording unit 205 includes the K color head unit 25K, the C color head unit 25C, the M color head unit 25M, and the Y color head unit 25Y arranged in a row in a conveyance direction (sub-scanning direction) of the printing paper 5. Each head unit 25 includes a plurality of ink ejection heads (print heads) 251 arranged in a staggered manner. Each ink ejection head 251 includes a large number of nozzles (not illustrated in FIG. 3) that eject ink. Each nozzle of the ink ejection head 251 included in the K color head unit 25K ejects K color ink, each nozzle of the ink ejection head 251 included in the C color head unit 25C ejects C color ink, each nozzle of the ink ejection head 251 included in the M color head unit 25M ejects M color ink, and each nozzle of the ink ejection head 251 included in the Y color head unit 25Y ejects Y color ink.

Figure 4:
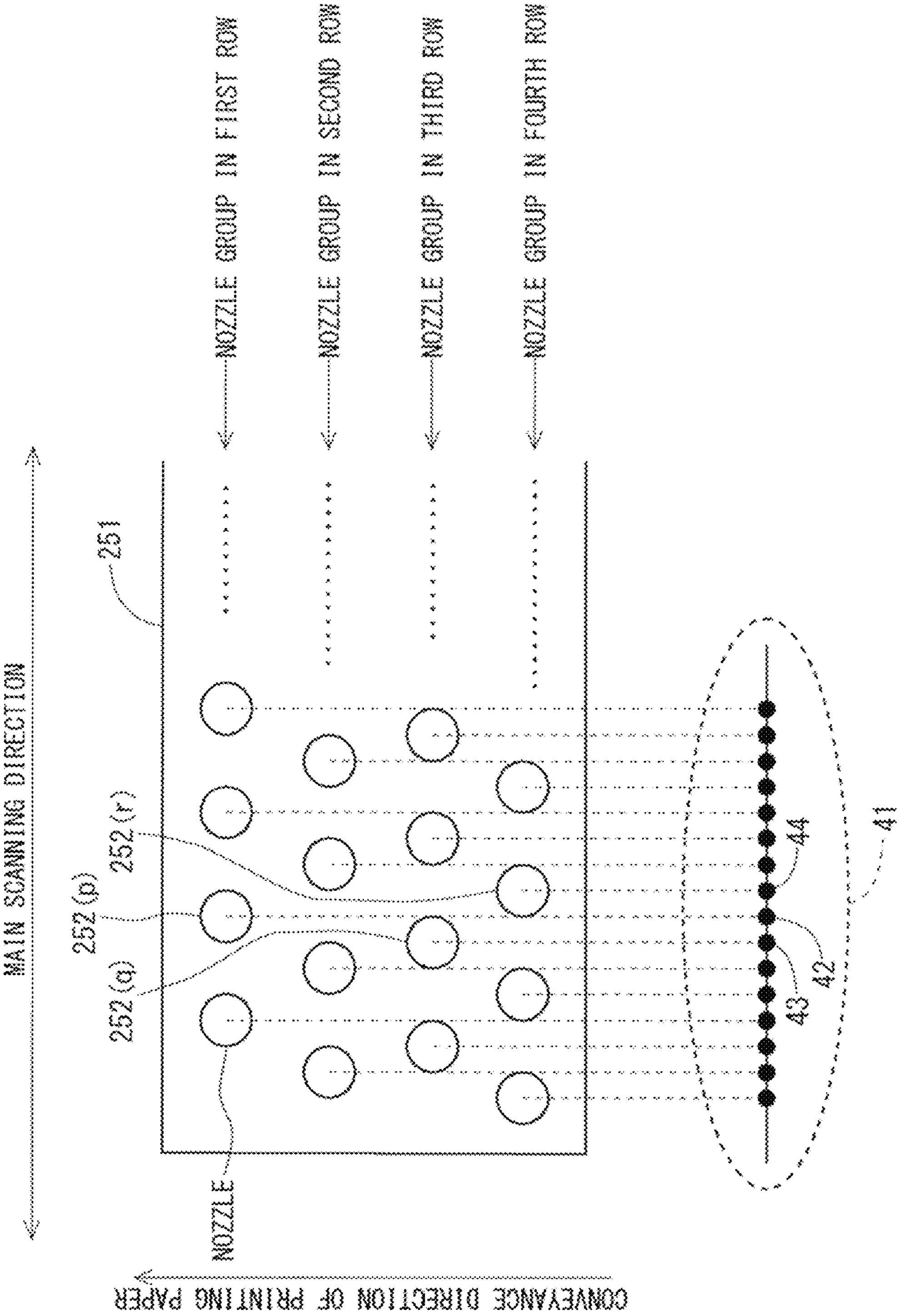
FIG. 4 is a diagram for explaining an arrangement of nozzles in an ink ejection head in the embodiment.

FIG. 4 is a diagram for explaining an arrangement example of nozzles in the ink ejection head 251. Typically, the ink ejection head 251 includes a plurality of rows of nozzle groups each including a plurality of nozzles arranged side by side in a main scanning direction (direction orthogonal to the conveyance direction of the printing paper 5). In the example illustrated in FIG. 4, four rows of nozzle groups are included in the ink ejection head 251. In FIG. 4, a portion denoted by reference sign 41 schematically illustrates landing positions of the ink ejected from each nozzle on the printing paper 5. The plurality of nozzles in the ink ejection head 251 are arranged so that the landing positions of the ink ejected from the nozzles included in the nozzle group in the first row, the landing positions of the ink ejected from the nozzles included in the nozzle group in the second row, the landing positions of the ink ejected from the nozzles included in the nozzle group in the third row, and the landing positions of the ink ejected from the nozzles included in the nozzle group in the fourth row are different positions. For example, the landing position of the ink ejected from each nozzle included in the nozzle group in the first row is a position between the landing position of the ink ejected from the nozzle included in the nozzle group in the third row and the landing position of the ink ejected from the nozzle included in the nozzle group in the fourth row. In the example illustrated in FIG. 4, the landing position 42 of the ink ejected from the nozzle denoted by reference sign 252(*p*) is a position between the landing position 43 of the ink ejected from the nozzle denoted by reference sign 252(*q*) and the landing position 44 of the ink ejected from the nozzle denoted by reference sign 252(*r*). Therefore, adjacent nozzles (nozzles on either side) of the nozzle denoted by reference sign 252(*p*) are a nozzle denoted by reference sign 252(*q*) and a nozzle denoted by reference sign 252(*r*).

3. Hardware Configuration of Print Control Device

Figure 5:
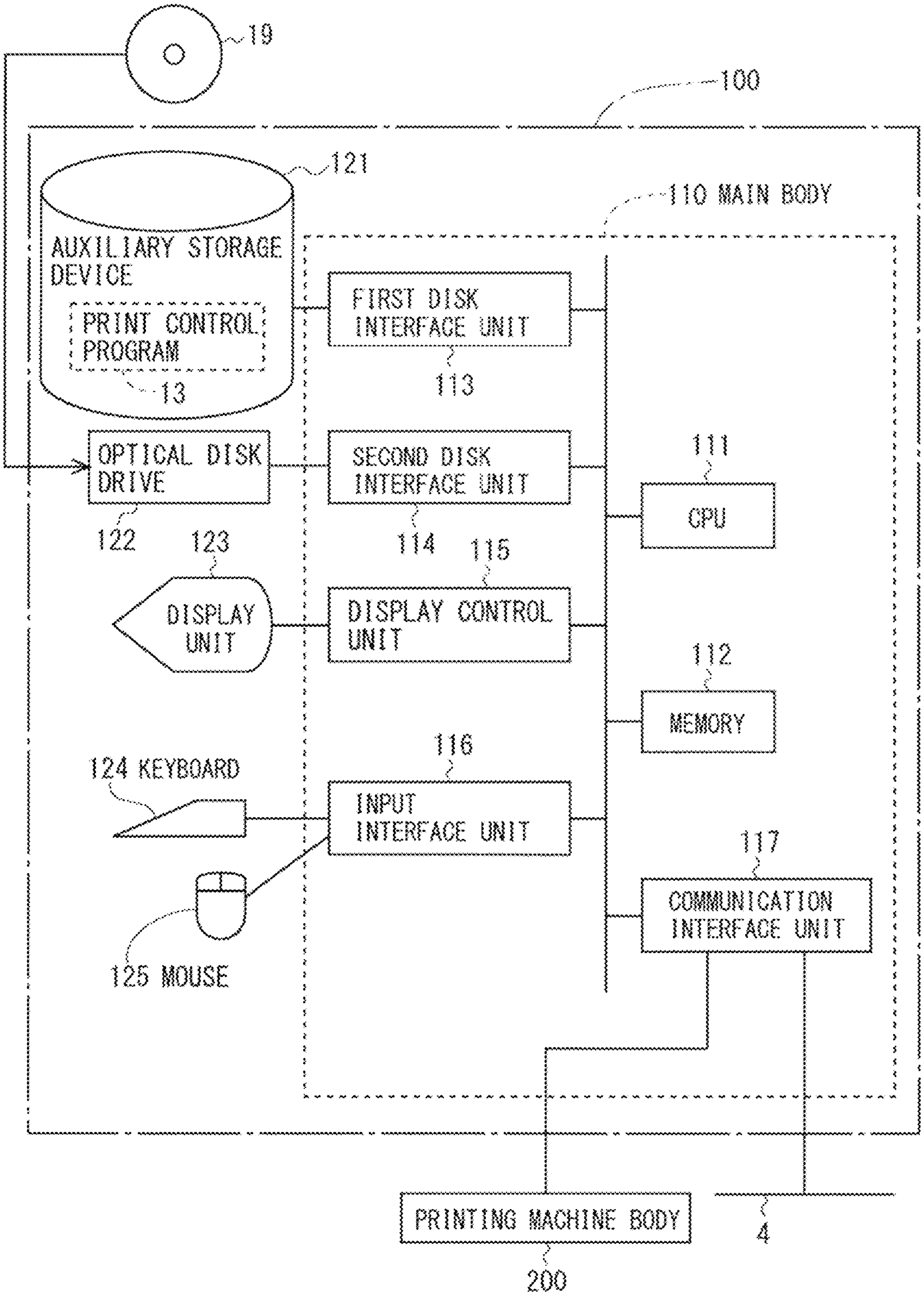
FIG. 5 is a block diagram illustrating hardware configuration of a print control device in the embodiment.

FIG. 5 is a block diagram illustrating a hardware configuration of the print control device 100. As illustrated in FIG. 5, the print control device 100 includes a main body 110, an auxiliary storage device 121, an optical disk drive 122, a display unit 123, a keyboard 124, a mouse 125, and the like. The main body 110 includes a CPU 111, a memory 112, a first disk interface unit 113, a second disk interface unit 114, a display control unit 115, an input interface unit 116, and a communication interface unit 117. The CPU 111, the memory 112, the first disk interface unit 113, the second disk interface unit 114, the display control unit 115, the input interface unit 116, and the communication interface unit 117 are connected to each other via a system bus. The auxiliary storage device 121 is connected to the first disk interface unit 113. The optical disk drive 122 is connected to the second disk interface unit 114. The display unit (display device) 123 is connected to the display control unit 115. The keyboard 124 and the mouse 125 are connected to the input interface unit 116. The printing machine body 200 is connected to the communication interface unit 117 via a communication cable. Furthermore, the communication interface unit 117 is connected to the LAN 4. The auxiliary storage device 121 is a magnetic disk device or the like. An optical disk 19 as a computer-readable recording medium such as a CD-ROM or a DVD-ROM is inserted into the optical disk drive 122. The display unit 123 is a liquid crystal display or the like. The display unit 123 is used to display information desired by an operator. The keyboard 124 and the mouse 125 are used by a worker to input instructions to the print control device 100.

The auxiliary storage device 121 stores a print control program (program for controlling execution of a printing process by the printing machine body 200) 13. The print control program 13 according to the present embodiment includes, as a subprogram, a compensation coefficient determination program that determines a coefficient (hereinafter, it is referred to as a "compensation coefficient") to be applied to an ink amount compensation process that compensates for the amount of ink ejected onto the printing paper 5 when an ejection defect nozzle is present. The CPU 111 implements various functions of the print control device 100 by reading the print control program 13 stored in the auxiliary storage device 121 into the memory 112 and executing the program. The memory 112 includes a random access memory (RAM) and a read only memory (ROM). The memory 112 functions as a work area for the CPU 111 to execute the print control program 13 stored in the auxiliary storage device 121. Note that the print control program 13 is provided by being stored in the computer-readable recording medium (non-transitory recording medium). That is, for example, the user purchases the optical disk 19 as a recording medium of the print control program 13, inserts the optical disk into the optical disk drive 122, reads the print control program 13 from the optical disk 19, and installs the print control program in the auxiliary storage device 121.

4. Outline of Correction Process

In the inkjet printing apparatus 10 according to the present embodiment, a correction process for suppressing the occurrence of density unevenness due to variations in the ejection amount of ink among a plurality of nozzles and the occurrence of defects (for example, white streaks and dot missing) in a print image due to the presence of ejection defect nozzles is performed. Specifically, as the correction processes, a shading correction process of compensating for variations in the ejection amount of ink among the plurality of nozzles, and an ink amount compensation process of compensating for the amount of ink ejected onto the printing paper 5 when an ejection defect nozzle is present are performed. The ink amount compensation process is a process for realizing the alternative droplet ejection described above. The shading correction process and the ink amount compensation process will be described below with reference to FIGS. 6 and 7. Here, attention is paid to five pixel portions 7(1) to 7(5) corresponding to five nozzles. It is assumed that single-color printing is performed in the five pixel portions 7(1) to 7(5) with ink of the same color ejected from the five nozzles. Note that, regarding FIGS. 6 and 7, the numerical values inside the rectangles respectively corresponding to the pixel portions 7(1) to 7(5) represent density values in the data.

Figure 6:
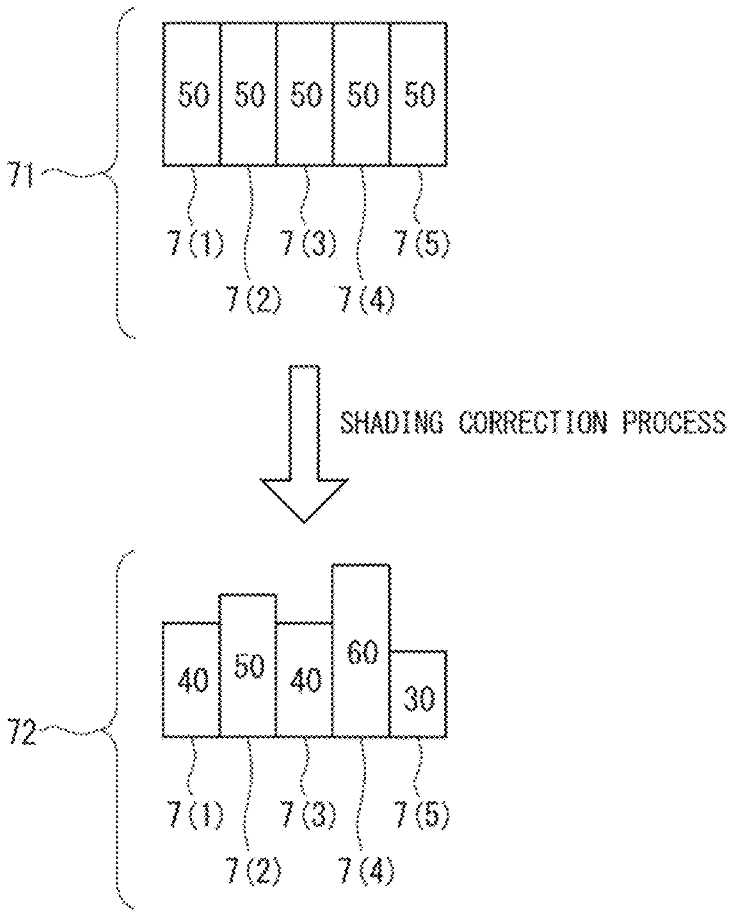
FIG. 6 is a diagram for explaining shading correction process in the embodiment.

First, the shading correction process will be described with reference to FIG. 6. Here, it is assumed that when printing of a constant density (50%) is performed without executing the shading correction process, (5/4) times the amount of ink ejected to the pixel portion 7(2) is ejected to the pixel portion 7(1) and the pixel portion 7(3), (5/6) times the amount of ink ejected to the pixel portion 7(2) is ejected to the pixel portion 7(4), and (5/3) times the amount of ink ejected to the pixel portion 7(2) is ejected to the pixel portion 7(5). In this case, density values indicated in a portion denoted by reference sign 71 are corrected to density values indicated in a portion denoted by reference sign 72 by the shading correction process. By correcting the density data in this manner, the variation in the ejection amount of ink among the plurality of nozzles is reduced, and the occurrence of density unevenness is suppressed.

Figure 7:
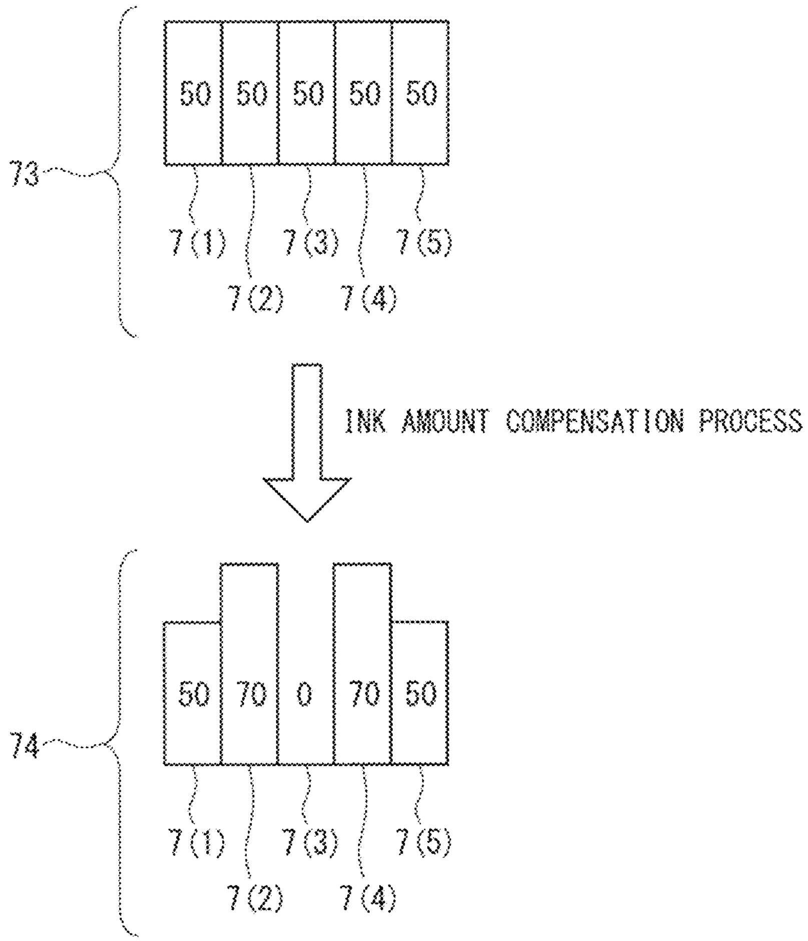
FIG. 7 is a diagram for explaining an ink amount compensation process in the embodiment.

Next, the ink amount compensation process will be described with reference to FIG. 7. Here, it is assumed that a nozzle corresponding to the pixel portion 7(3) is an ejection defect nozzle. In this case, for example, the density values indicated in the portion denoted by reference sign 73 are corrected to the density values indicated in the portion denoted by reference sign 74 by the ink amount compensation process. The density value is corrected from 50 to 0 for the pixel portion 7(3), and the density value is corrected from 50 to 70 for the pixel portion 7(2) and the pixel portion 7(4). By correcting the density data in this manner, a larger amount of ink than originally intended is ejected from each of the adjacent nozzles of the ejection defect nozzle. As a result, the defect of the print image caused by the ink not being normally ejected from the ejection defect nozzle becomes inconspicuous. That is, the occurrence of defects in the print image is suppressed. Note that, in the present embodiment, the ink amount compensation process is performed on shading data to be described later.

5. Procedure of Print Output

A print output procedure in the printing system will be described with reference to a flowchart illustrated in FIG. 8. Here, it is assumed that the compensation coefficient used for the ink amount compensation process has already been determined.

First, the inkjet printing apparatus 10 performs a process (shading data generation process) of generating shading data, which is data used when the shading correction process is performed on the print data (step S10). Details of the shading data generation process will be described later.

Next, the shading data generated in step S10 is corrected by performing the ink amount compensation process on the shading data using a compensation coefficient determined as described later (step S20). When the compensation coefficient used in the ink amount compensation process is represented by C, which is a value of 0 or more and 1 or less, a value of a position corresponding to an ejection defect nozzle (a true defective nozzle to be described later) in the shading data before the process of step S20 is executed is represented by Vf, a value of a position corresponding to an adjacent nozzle of the ejection defect nozzle in the shading data before the process of step S20 is executed is represented by Vn, and a value of a position corresponding to the adjacent nozzle of the ejection defect nozzle in the shading data after the process of step S20 is executed is represented by V, V is represented by the following Formula (1).

$$V = Vn + Vf \times C \quad (1)$$

Note that the value of the position corresponding to the ejection defect nozzle in the shading data after the process in step S20 is executed is 0.

As described above, in the present embodiment, the shading data is corrected by the ink amount compensation process. Note that, in step S50 described later, the print data is corrected using the corrected shading data. Therefore, hereinafter, this corrected shading data is also referred to as a "correction coefficient".

After the shading data is corrected, the print data generation apparatus 30 performs the rasterization process on submitted data such as a PDF file to generate print data (step S30). Then, the print data is transferred from the print data generation apparatus 30 to the print control device 100 in the inkjet printing apparatus 10 (step S40).

Thereafter, the print control device 100 performs a correction process on the print data using the shading correction coefficient obtained in step S20 (that is, the shading data after correction in step S20) to correct the print data (step S50).

After the shading correction process is finished, the print control device 100 generates halftone image data by performing a halftone process on the print data after correction in step S50 (step S60).

Finally, printing by the recording unit 205 is performed on the basis of the halftone image data generated in step S60 (step S70). That is, the ejection of ink from a large number of nozzles included in each ink ejection head 251 constituting the recording unit 205 is controlled based on the halftone image data, whereby an image is formed on the printing paper 5.

Note that the processes in steps S10 and S20 are not necessarily executed for each print job. That is, after the processes of steps S10 and S20 are executed once, the processes of steps S30 to S70 can be repeatedly executed for a plurality of print jobs.

In the present embodiment, generating shading data is realized by step S10, correcting the shading data is realized by step S20, generating print data is realized by step S30, correcting the print data is realized by step S50, generating halftone image data is realized by step S60, and ejecting ink is realized by step S70.

Figure 8:
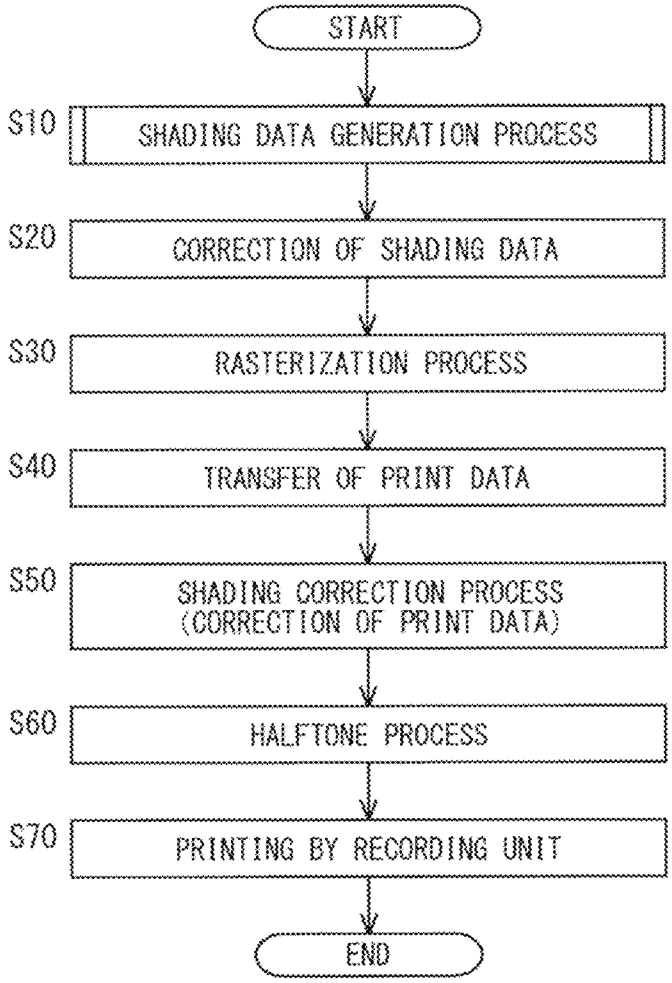
FIG. 8 is a flowchart illustrating a procedure of a print output in the printing system according to the embodiment.
Figure 9:
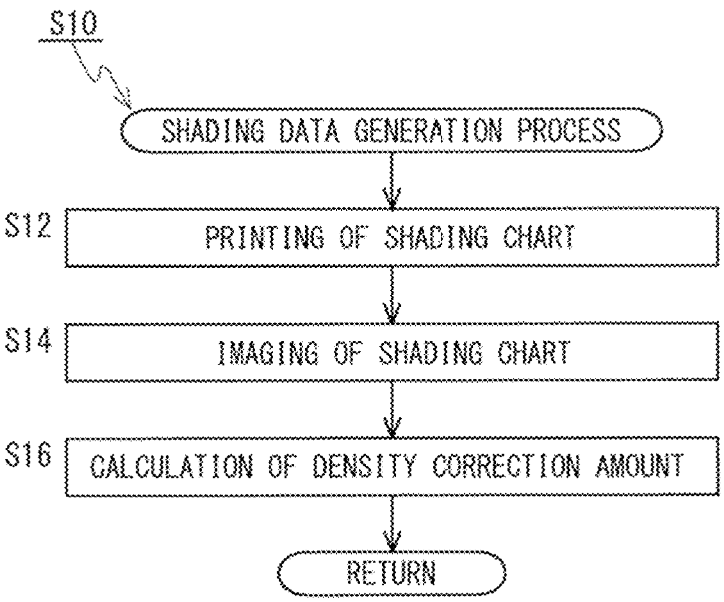
FIG. 9 is a flowchart illustrating a detailed procedure of a shading data generation process in the embodiment.
Figure 10:
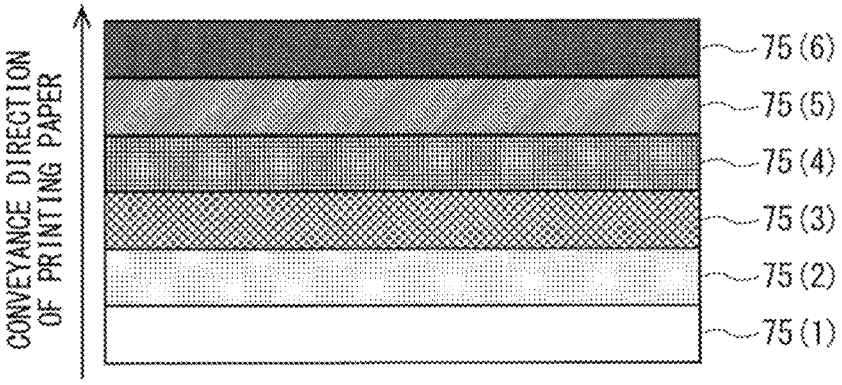
FIG. 10 is a diagram illustrating an example of a shading chart in the embodiment.

FIG. 9 is a flowchart illustrating a detailed procedure of the shading data generation process (process of step S10 of FIG. 8). After the shading data generation process starts, first, for example, a shading chart as illustrated in FIG. 10 is printed (step S12). Note that the shading chart data representing the shading chart is held in advance in the auxiliary storage device 121 in the print control device 100. The shading chart is an image whose density changes stepwise in the conveyance direction (sub-scanning direction) of the printing paper 5. With respect to the shading chart illustrated in FIG. 10, for example, a density value of a portion denoted by reference sign 75(1) is 5%, a density value of a portion denoted by reference sign 75(2) is 10%, a density value of a portion denoted by reference sign 75(3) is 30%, a density value of a portion denoted by reference sign 75(4) is 50%, a density value of a portion denoted by reference sign 75(5) is 80%, and a density value of a portion denoted by reference sign 75(6) is 100%.

After printing the shading chart, the inline scanner 40 images the shading chart (step S14). Then, a correction amount of the density is calculated by a known method based on the imaging data obtained in S14 step (step S16). Data representing this correction amount of the density is shading data. When the process of step S16 ends, the shading data generation process ends.

6. Details of Correction Process

Details of the correction process will be described below.

<6.1 Functional Configuration of Control Unit>

Figure 11:
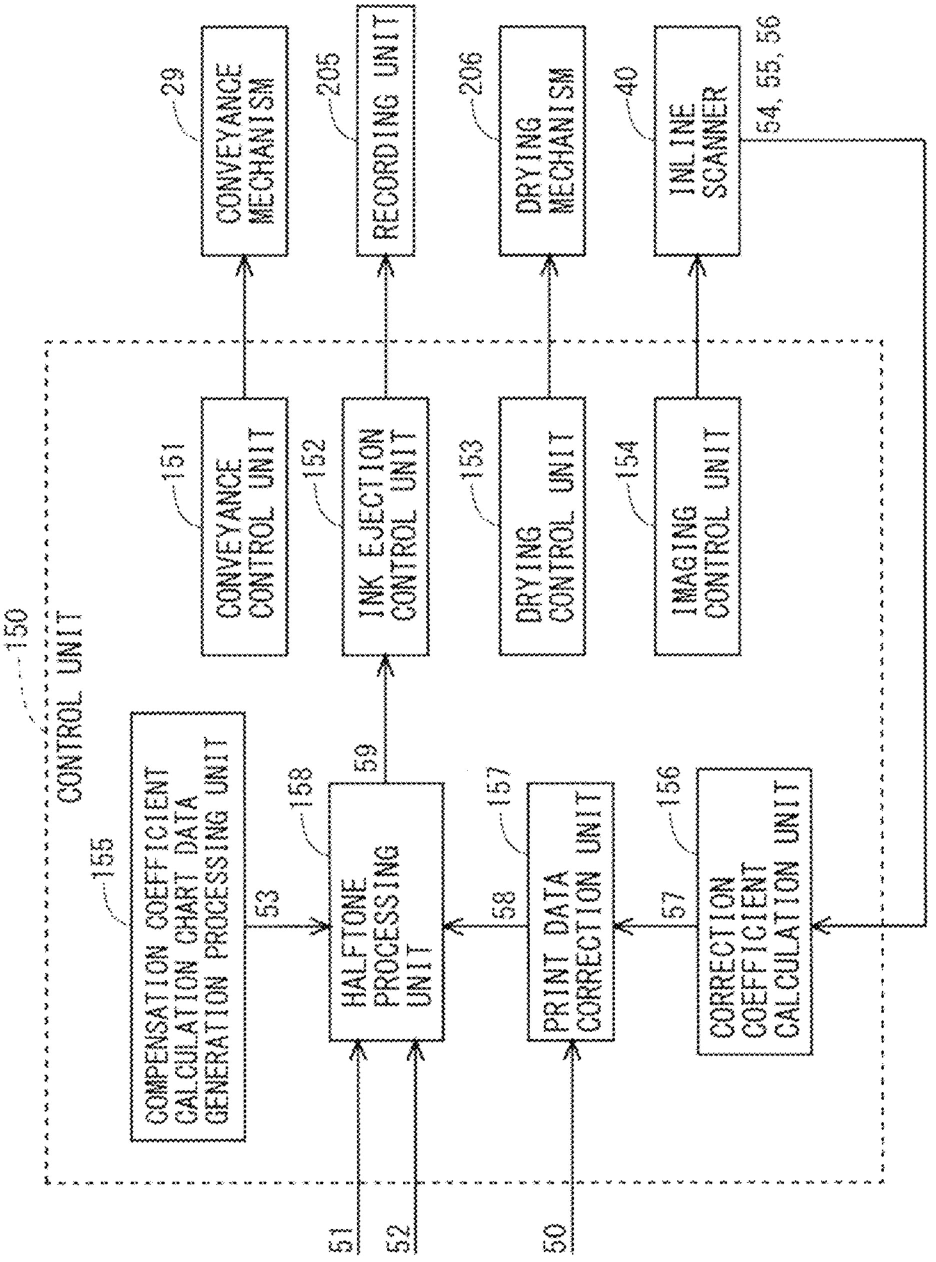
FIG. 11 is a block diagram illustrating a functional configuration of a control unit realized by executing a print control program in the print control device in the embodiment.

FIG. 11 is a block diagram illustrating a functional configuration of the control unit 150 implemented by the print control device 100 executing the print control program 13. The control unit 150 includes a conveyance control unit 151, an ink ejection control unit 152, a drying control unit 153, an imaging control unit 154, a compensation coefficient calculation chart data generation processing unit 155, a correction coefficient calculation unit 156, a print data correction unit 157, and a halftone processing unit 158.

The conveyance control unit 151 controls the speed (conveyance speed) at which the conveyance mechanism 29 conveys the printing paper 5. Note that the conveyance mechanism 29 is realized by the paper feeding unit 202, the first drive roller 203, the plurality of support rollers 204, the second drive roller 207, and the paper winding unit 208 (refer to FIG. 2). The drying control unit 153 controls a temperature (drying temperature) when the drying mechanism 206 dries the printing paper 5 after printing. The imaging control unit 154 controls the imaging timing of the print image by the inline scanner 40.

The compensation coefficient calculation chart data generation processing unit 155 generates compensation coefficient calculation chart data 53 representing a compensation coefficient calculation chart for determining a compensation coefficient to be used in the ink amount compensation process. Note that the generation of the compensation coefficient calculation chart data 53 will be described in detail later.

The correction coefficient calculation unit 156 calculates a correction coefficient 57 for correcting print data 50 generated by the print data generation apparatus 30 based on first imaging data 54 obtained by the inline scanner 40 imaging an ejection defect detection chart for detecting an ejection defect nozzle, second imaging data 55 obtained by the inline scanner 40 imaging a compensation coefficient calculation chart, and third imaging data 56 obtained by the inline scanner 40 imaging a shading chart as illustrated in FIG. 10. Note that details of the correction coefficient calculation unit 156 will be described later.

The print data correction unit 157 corrects the print data 50 generated by the print data generation apparatus 30 using the correction coefficient 57 calculated by the correction coefficient calculation unit 156. In other words, the print data correction unit 157 performs the shading correction process on the print data 50 generated by the print data generation apparatus 30 using the correction coefficient 57 calculated by the correction coefficient calculation unit 156. The print data correction unit 157 outputs corrected print data 58.

The halftone processing unit 158 generates halftone image data 59 including information indicating a dot size of ink corresponding to each pixel by performing a halftone process on data to be printed. As the dot sizes of the ink, for example, three-stage sizes (L size, M size, S size) are prepared. In the present embodiment, the halftone process is performed on the print data 58 corrected by the print data correction unit 157, shading chart data 51 representing the shading chart, ejection defect detection chart data 52 representing the ejection defect detection chart, and the compensation coefficient calculation chart data 53 generated by the compensation coefficient calculation chart data generation processing unit 155. Note that a specific method of the halftone process is not particularly limited, and for example, a known method such as an error diffusion method or a dither method can be adopted. Furthermore, a part of the ejection defect detection chart data 52 (for example, data of a portion corresponding to a portion 681 representing a stepwise pattern described later with reference to FIG. 26) may not be subjected to the halftone process.

The ink ejection control unit 152 controls the amount of ink ejected from each nozzle included in each ink ejection head 251 constituting the recording unit 205 based on the halftone image data 59 generated by the halftone processing unit 158.

Figure 12:
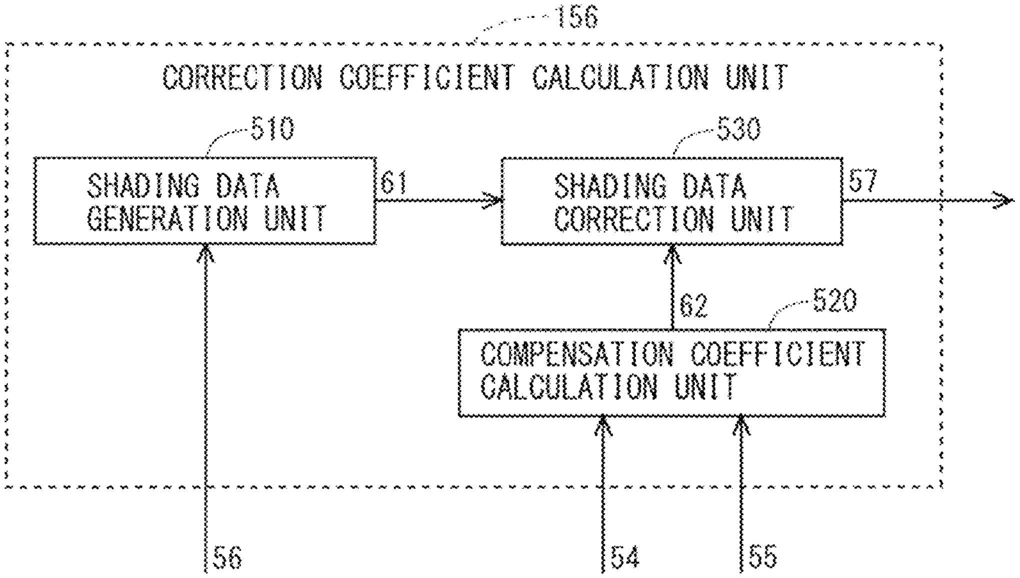
FIG. 12 is a block diagram illustrating a detailed configuration of a correction coefficient calculation unit in the embodiment.

FIG. 12 is a block diagram illustrating a detailed configuration of the correction coefficient calculation unit 156. The correction coefficient calculation unit 156 includes a shading data generation unit 510, a compensation coefficient calculation unit 520, and a shading data correction unit 530.

The shading data generation unit 510 generates shading data (data representing the correction amount of the density) 61 on the basis of the third imaging data 56 obtained by the inline scanner 40 imaging the shading chart as illustrated in FIG. 10.

The compensation coefficient calculation unit 520 obtains a compensation coefficient 62 used for the ink amount compensation process based on the first imaging data 54 obtained by the inline scanner 40 imaging the ejection defect detection chart and the second imaging data 55 obtained by the inline scanner 40 imaging the compensation coefficient calculation chart. Note that details of the compensation coefficient calculation unit 520 will be described later.

The shading data correction unit 530 performs the ink amount compensation process on the shading data 61 generated by the shading data generation unit 510 using the compensation coefficient 62 obtained by the compensation coefficient calculation unit 520. As a result, the correction coefficient 57 for correcting the print data 50 is obtained.

Figure 13:
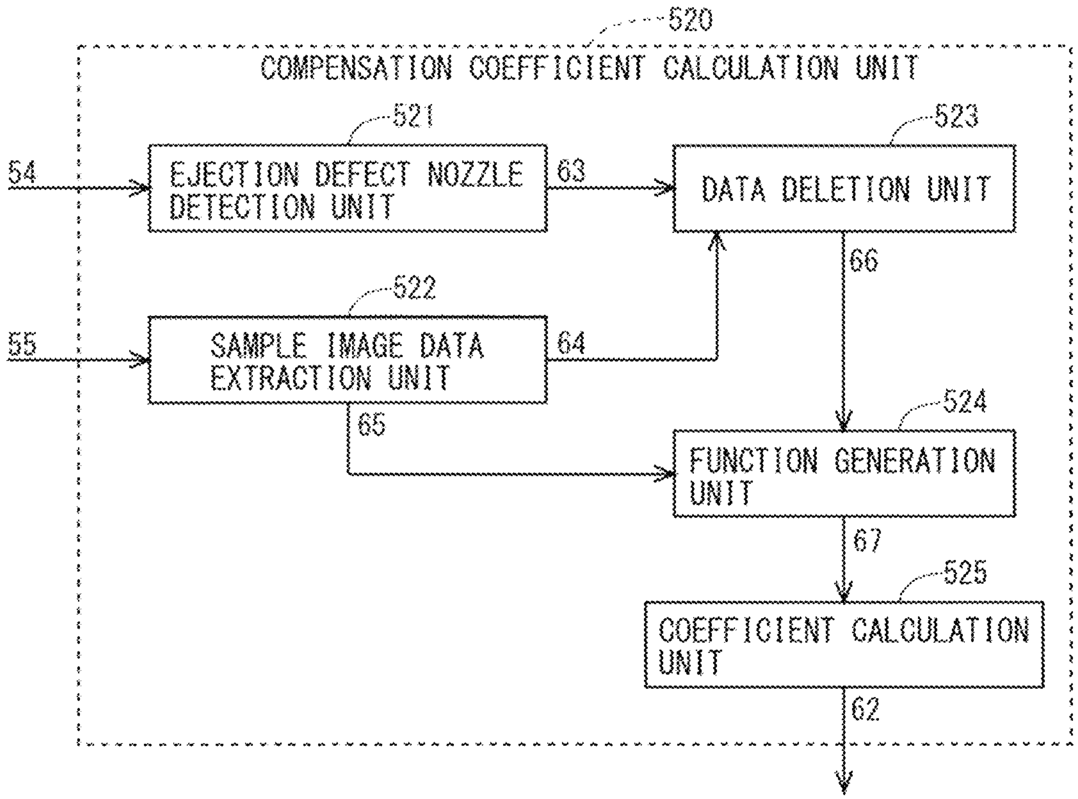
FIG. 13 is a block diagram illustrating a detailed configuration of the compensation coefficient calculation unit in the embodiment.

FIG. 13 is a block diagram illustrating a detailed configuration of the compensation coefficient calculation unit 520. The compensation coefficient calculation unit 520 includes an ejection defect nozzle detection unit 521, a sample image data extraction unit 522, a data deletion unit 523, a function generation unit 524, and a coefficient calculation unit 525.

The ejection defect nozzle detection unit 521 detects an ejection defect nozzle 63 based on the first imaging data 54. A specific method of detecting the ejection defect nozzle 63 is not particularly limited, but for example, the ejection defect nozzle 63 can be detected by a method using machine learning.

The sample image data extraction unit 522 extracts, from the second imaging data 55, a plurality of pieces of sample image data 64 corresponding to a plurality of comparison regions set for determining the compensation coefficient 62 to be applied to the ink amount compensation process. The sample image data extraction unit 522 further extracts normal region data 65 corresponding to the normal region from the second imaging data 55. Note that the comparison region and the normal region will be described later.

The data deletion unit 523 deletes, from the plurality of pieces of sample image data 64, data corresponding to the position of the nozzle (ejection defect nozzle) 63 detected by the ejection defect nozzle detection unit 521. As a result, a plurality of pieces of sample image data 66 obtained by deleting data corresponding to the position of the ejection defect nozzle 63 is outputted from the data deletion unit 523. Note that the plurality of pieces of sample image data 66 are associated with a plurality of provisional compensation coefficients prepared for convenience in order to determine the compensation coefficient 62 to be actually applied to the ink amount compensation process.

Based on the plurality of pieces of sample image data 66 and the normal region data 65, the function generation unit 524 generates a function 67 representing a correspondence relationship between coefficient values including a plurality of provisional compensation coefficients and luminance differences between a luminance value in the sample image data 66 and a luminance value in the normal region data 65. The coefficient calculation unit 525 calculates the compensation coefficient 62 actually applied to the ink amount compensation process using the function 67 generated by the function generation unit 524. Note that the generation of the function 67 by the function generation unit 524 and the calculation of the compensation coefficient 62 by the coefficient calculation unit 525 will be described in detail later.

<6.2 Method of Determining Compensation Coefficient>

<6.2.1 Concept>

A way of determining the compensation coefficient 62 will be described with reference to FIGS. 14 to 17. The compensation coefficient 62 is a coefficient used in the ink amount compensation process. As described above, in the ink amount compensation process, data of the density (in the present embodiment, shading data) of the pixel portion corresponding to the ejection defect nozzle and the pixel portions corresponding to the adjacent nozzles of the ejection defect nozzle (nozzles on both sides of the ejection defect nozzle) is corrected (see FIG. 7). At this time, a value obtained by multiplying the original density value of the pixel portion corresponding to the ejection defect nozzle by the compensation coefficient 62 is added to the original density value of the pixel portion of each of the adjacent nozzles of the ejection defect nozzle. Note that the suitable compensation coefficient 62 varies depending on the type of printing paper 5 and printing conditions.

Figure 14:
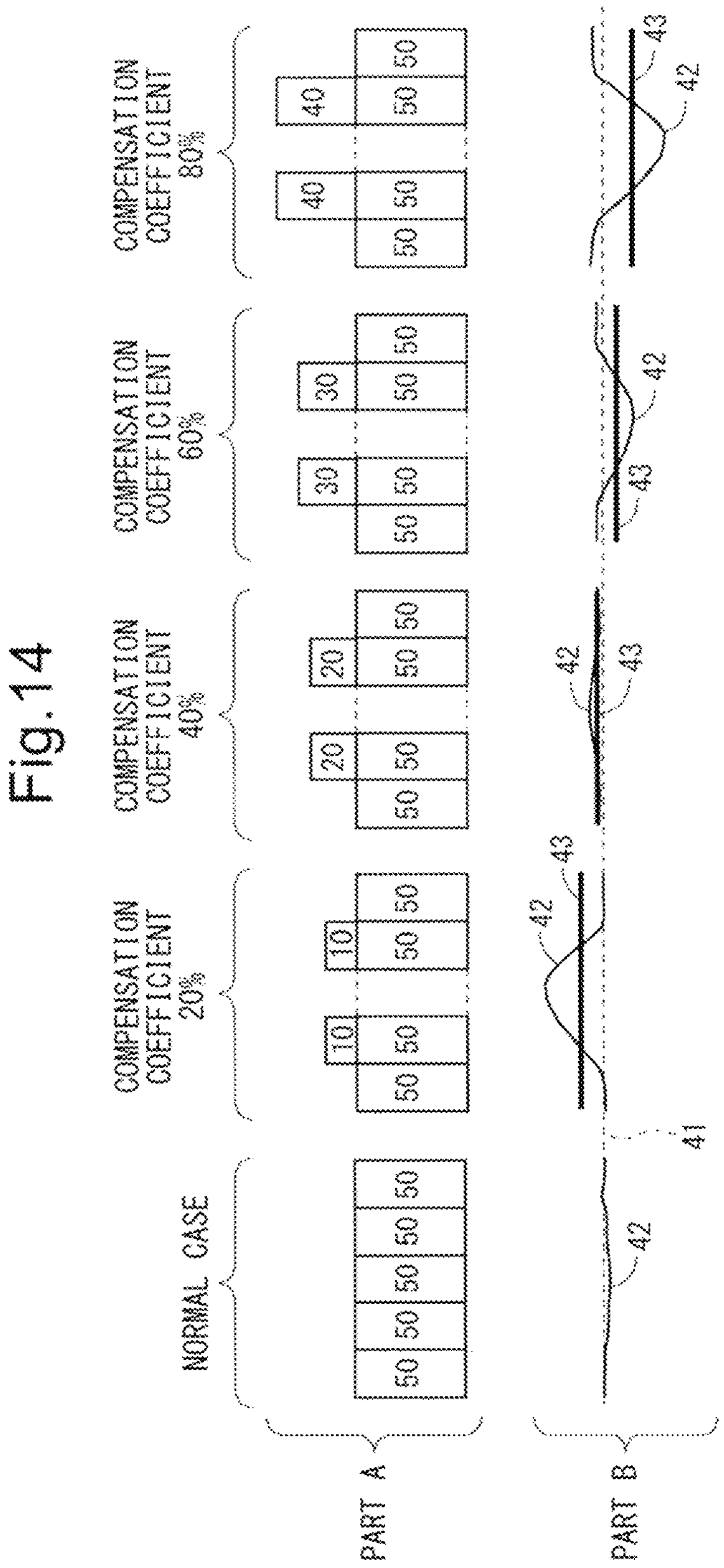
FIG. 14 is a diagram for explaining a concept of a method of determining a compensation coefficient in the embodiment.

Part A of FIG. 14 schematically illustrates density values for 5 pixels of a normal case in which an ejection defect nozzle is not present and density values for 5 pixels of each of four cases in which the ink amount compensation process is performed using four kinds of compensation coefficients when an ejection defect nozzle is present. Furthermore, in Part B of FIG. 14, the target luminance value is indicated by a dotted line denoted by reference sign 41, the distribution (spatial change) of the luminance values in the five pixel portions for each case is indicated by a solid line denoted by reference sign 42, and the average value of the luminance values (that is, average luminance value) for each case other than the normal case is indicated by a thick solid line denoted by reference sign 43. For example, in the case of the "compensation coefficient 208", since the amount of ink ejected to the relevant region is small, the average luminance value in the relevant region is higher than the target luminance value. Furthermore, for example, in the case of the "compensation coefficient 60%", the amount of ink ejected to the relevant region is large, and thus the average luminance value in the relevant region is lower than the target luminance value. In the example illustrated in FIG. 14, in the case of the "compensation coefficient 40%", the average luminance value in the relevant region is close to the target luminance value. Note that, in the example illustrated in FIG. 14, it is assumed that a target luminance value 41 is set, and a compensation coefficient with which a distribution 42 of luminance values in which a difference between the target luminance value 41 and the average luminance value 43 is minimized is obtained is determined as a final compensation coefficient. However, the target luminance value 41 is not necessarily required. For example, the configuration may be such that the maximum value and the minimum value of the luminance values on the distribution 42 of the luminance values, and the difference therebetween are acquired, and the compensation coefficient with which the minimum difference is obtained is determined as the final compensation coefficient.

In the present embodiment, various compensation coefficients are prepared as provisional compensation coefficients, and the ink amount compensation process is performed using the provisional compensation coefficients. Using the imaging data of the print image based on the obtained data, a function representing a correspondence relationship between coefficient values (values of the compensation coefficient) and luminance differences between a luminance value obtained by the ink amount compensation process and a target luminance value is obtained. More specifically, in the present embodiment, 14 provisional compensation coefficients (1.0, 1.05, 1.1, 1.15, 1.2, 1.25, 1.3, 1.35, 1.4, 1.45, 1.5, 1.55, 1.6, 1.65) are prepared. Furthermore, for each ink ejection head 251, the region in the main scanning direction is divided into 14 comparison regions corresponding to the 14 provisional compensation coefficients and a normal region (a region not affected by a tentative defective nozzle described later) corresponding to the normal case. Moreover, for each of the 14 comparison regions, four tentative defective nozzles that are virtually regarded as being in the ejection defect state are set from among a plurality of corresponding nozzles. The position of the tentative defective nozzle is not particularly limited, but it is desirable to select a nozzle in which ejection defects are likely to be noticeable (For example, a nozzle that ejects ink before other nozzles. As an example, a nozzle belonging to the nozzle groups in the first row or the second row in FIG. 4.) as a tentative defective nozzle. The same provisional compensation coefficient is applied to these four tentative defective nozzles. Then, the above-described function is obtained on the basis of the second imaging data 55 obtained by imaging the compensation coefficient calculation chart including the images corresponding to the 14 comparison regions and the normal region.

Note that here, an example of using 14 provisional compensation coefficients in increments of 0.05 will be described, but the present invention is not limited thereto. For example, there may be a missing value, a plurality of provisional compensation coefficients in increments of 0.1 may be used, or the increments may not be constant. Furthermore, the number of tentative defective nozzles set in each comparison region may be one or more, and is not limited to four. If the number of tentative defective nozzles set in each comparison region is plural, data can be acquired from the comparison region even in a case where the tentative defective nozzle accidentally coincides with a true defective nozzle to be described later, and thus there is an advantage that the robustness is improved.

Figure 15:
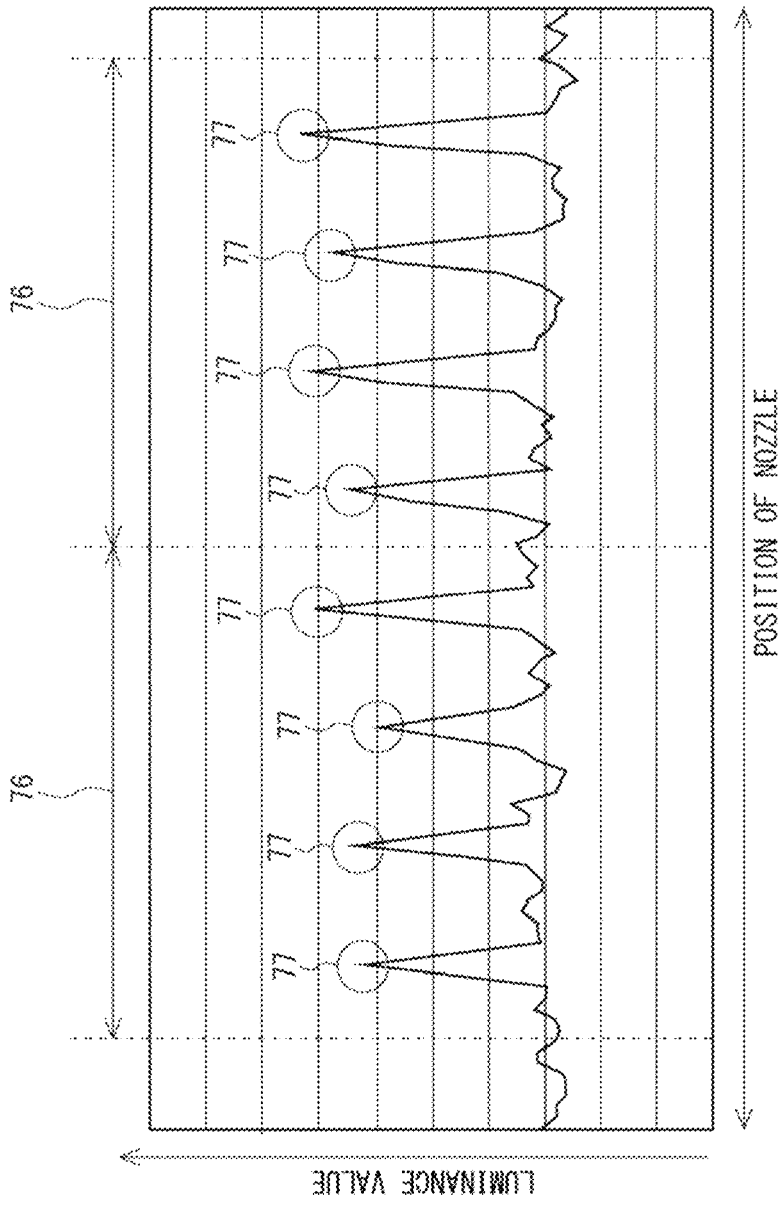
FIG. 15 is a diagram illustrating an example of a distribution (spatial change) of luminance values obtained by the ink amount compensation process for two comparison regions corresponding to certain two provisional compensation coefficients in the embodiment.

FIG. 15 illustrates an example of the distribution (spatial change) of the luminance values obtained by the ink amount compensation process for two comparison regions 76 corresponding to certain two provisional compensation coefficients. The position of each portion denoted by reference sign 77 corresponds to the position of the tentative defective nozzle. Data corresponding to the position of the tentative defective nozzle is extracted as sample image data from the data of the distribution of the luminance values. In the example illustrated in FIG. 15, each sample image data includes data of four luminance values. However, in practice, the printing and imaging of the compensation coefficient calculation chart are repeated a plurality of times, so that the sample image data corresponding to one provisional compensation coefficient includes data of a large number of luminance values. Furthermore, data (not illustrated in FIG. 15) corresponding to the normal region is extracted as the normal region data from the data of the distribution of the luminance values. From the above, data of the luminance differences between the luminance value in the sample image data and the luminance value in the normal region data is obtained. For example, when sample image data corresponding to each provisional compensation coefficient includes data of 40 luminance values, data of 40 luminance differences is obtained for each provisional compensation coefficient.

Figure 16:
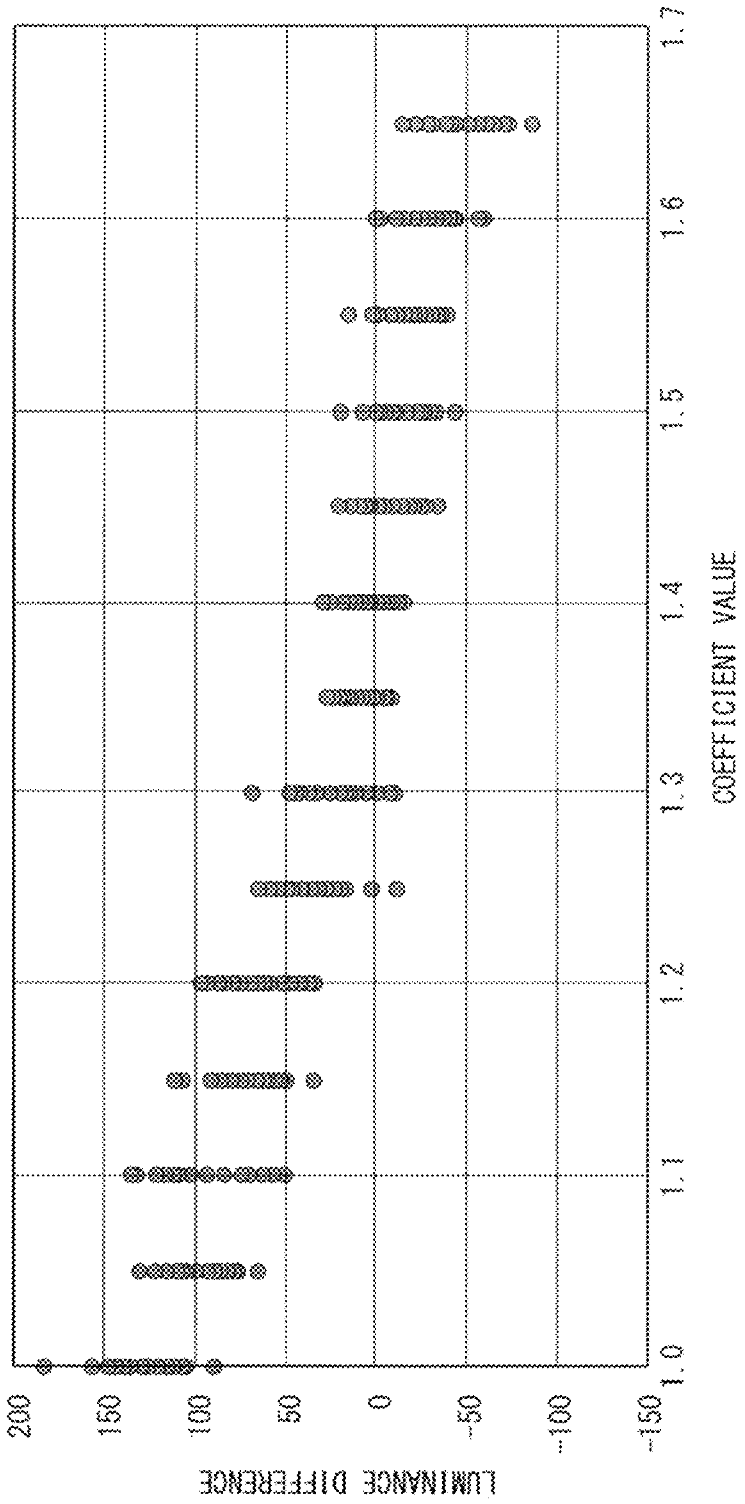
FIG. 16 is an example of a graph obtained when data of luminance differences obtained for 14 provisional compensation coefficients is plotted on a plane in the embodiment.

When data of the luminance differences obtained for the 14 provisional compensation coefficients is plotted on a plane in which the horizontal axis represents the coefficient value and the vertical axis represents the luminance difference, for example, a graph as illustrated in FIG. 16 is obtained. When a function most suitable (fitting) to the data of the luminance differences is obtained and a coefficient value at which the luminance difference becomes 0 based on the function is calculated, the coefficient value is considered to be an optimum value as the value of the compensation coefficient 62 applied to the ink amount compensation process.

Therefore, in the present embodiment, a nonlinear function that matches (fits) data of luminance differences obtained for the 14 provisional compensation coefficients is obtained. In other words, multiple regression analysis is performed with the coefficient value as an explanatory variable and the luminance difference as an objective variable (an explained variable). The nonlinear function is not particularly limited, but for example, a quadratic function represented by the following Formula (2) or an exponential function represented by the following Formula (3) can be adopted.

$$Y = aX^2 + bX + c \tag{2}$$

$$Y = a(1 - \exp(-bX)) + c \tag{3}$$

Here, X represents a coefficient value (a value of a compensation coefficient), Y represents a luminance difference, and a, b, and c represent coefficients in a nonlinear function. Furthermore, exp ( ) is a function that returns e (the base of the natural logarithm) raised to the power of Z when the value in parentheses is represented by Z.

Note that the coefficients a, b, and c in the above Formulas (2) and (3) can be obtained using a known method such as a least squares method.

Figure 17:
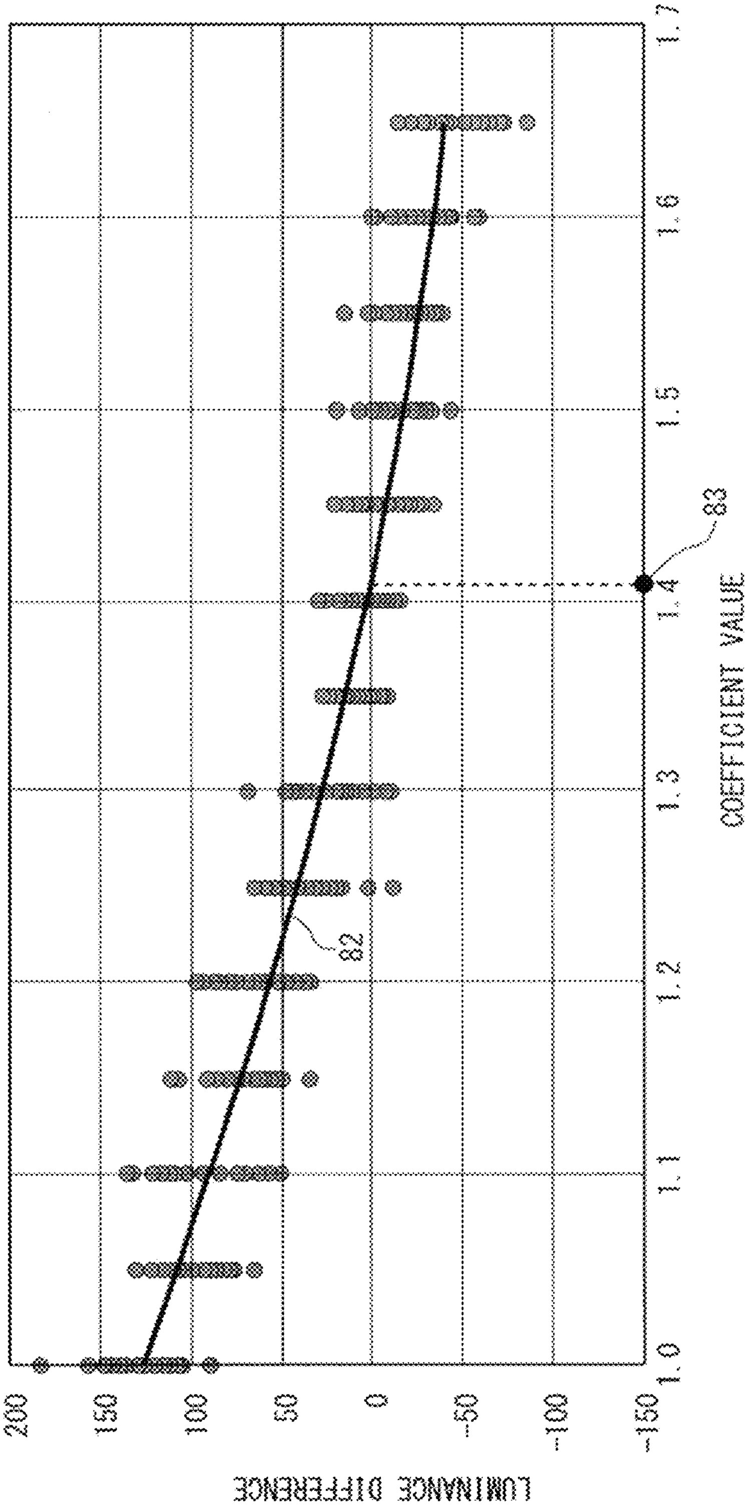
FIG. 17 is a diagram illustrating an example of a curve representing a quadratic function obtained based on data of luminance differences in the embodiment.

Here, it is assumed that a quadratic function represented by a curve denoted by reference sign 82 in FIG. 17 is obtained on the basis of data of luminance differences obtained for 14 provisional compensation coefficients. In this case, the coefficient value at which the luminance difference becomes 0 on the curve 82 representing the quadratic function is the value of the black spot portion denoted by reference sign 83 in FIG. 17. Therefore, in this case, the value (coefficient value) of the black spot portion is determined as the compensation coefficient 62 to be actually applied to the ink amount compensation process.

Meanwhile, in the present embodiment, 14 provisional compensation coefficients are prepared to generate a non-linear function representing a correspondence relationship between coefficient values and luminance differences. However, at least 3 provisional compensation coefficients may be prepared to generate the nonlinear function.

<6.2.2 Process Procedure for Determination of Compensation Coefficient (Compensation Coefficient Determination Method)>

A procedure of a process of determining the compensation coefficient 62 will be described with reference to a flowchart illustrated in FIG. 18. First, for each ink ejection head 251, 15 divided regions including 14 comparison regions associated with the 14 provisional compensation coefficients different from each other and one normal region (region not affected by a tentative defective nozzle) are set (step S100). In this regard, in the present embodiment, the 15 divided regions are set such that the 14 comparison regions are arranged in the main scanning direction (direction orthogonal to the conveyance direction of the printing paper 5). Note that the number of provisional compensation coefficients to be prepared is not limited to 14. Furthermore, the normal region may not necessarily be provided for each ink ejection head 251.

By the way, in a case where five ink ejection heads 251 are provided for one ink color, 14 comparison regions and one normal region are set for each of the five ink ejection heads 251. Furthermore, as will be described later, the compensation coefficient calculation chart includes images for five sheets in the sub-scanning direction for each color. From the above, the comparison region corresponding to each provisional compensation coefficient exists at 25 (=5×5) locations. In this regard, the comparison regions for the 25 locations corresponding to the same provisional compensation coefficient are treated as one comparison region. However, for convenience of description, in the following description, attention is paid to one comparison region at on location among comparison regions at 25 locations corresponding to one provisional compensation coefficient.

Figure 19:
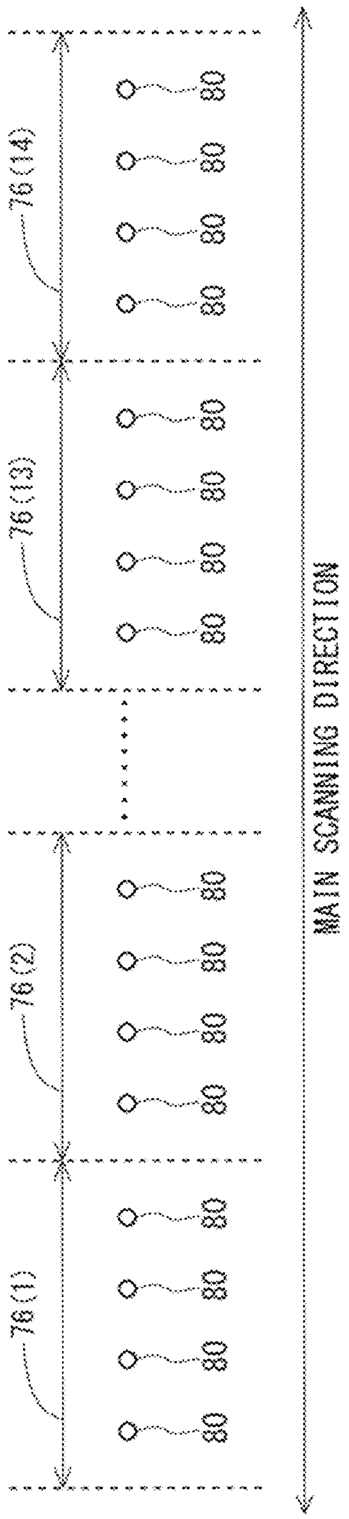
FIG. 19 is a diagram for explaining setting of a tentative defective nozzle in the embodiment.

After completion of step S100, for each of the 14 comparison regions, a plurality of tentative defective nozzles that are virtually regarded as being in the ejection defect state are set from among a plurality of corresponding nozzles (step S110). Note that, as described above, in the present embodiment, four tentative defective nozzles are set for each comparison region. That is, for each ink ejection head 251, as schematically illustrated in FIG. 19, four tentative defective nozzles 80 are set for each of the 14 comparison regions 76(1) to 76(14).

Figure 20:
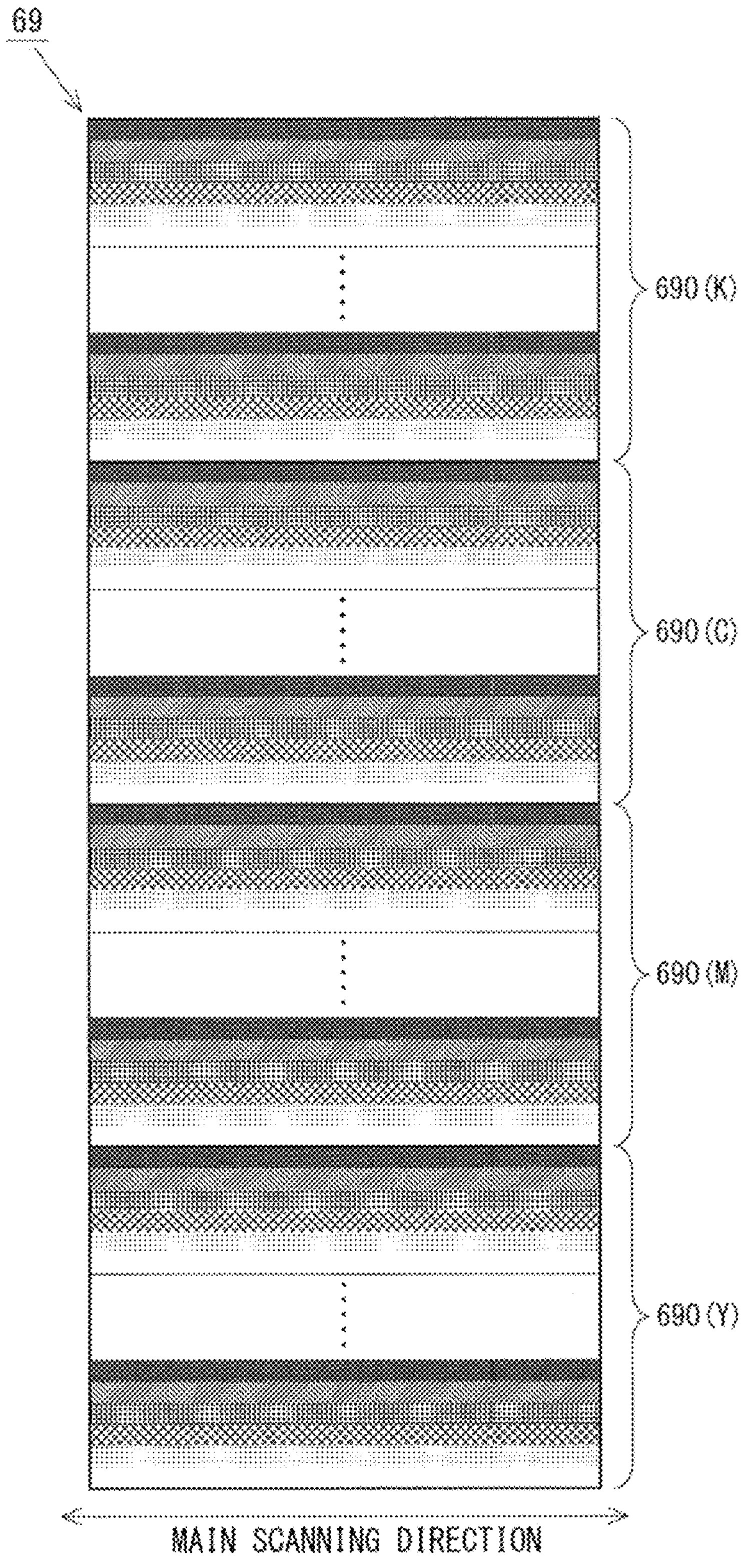
FIG. 20 is a schematic diagram illustrating an entire compensation coefficient calculation chart according to the embodiment.

Next, the compensation coefficient calculation chart data 53 representing a compensation coefficient calculation chart for determining the compensation coefficient 62 is generated (step S120). FIG. 20 is a schematic diagram illustrating an entire compensation coefficient calculation chart 69. As illustrated in FIG. 20, the compensation coefficient calculation chart 69 includes a portion 690(K) corresponding to K color, a portion 690(C) corresponding to C color, a portion 690(M) corresponding to M color, and a portion 690(Y) corresponding to Y color. However, in the following description, attention is paid to one color. The portion corresponding to each color includes images for a plurality of sheets. In this regard, in the present embodiment, an image of five sheets is included in a portion corresponding to each color.

Figure 21:
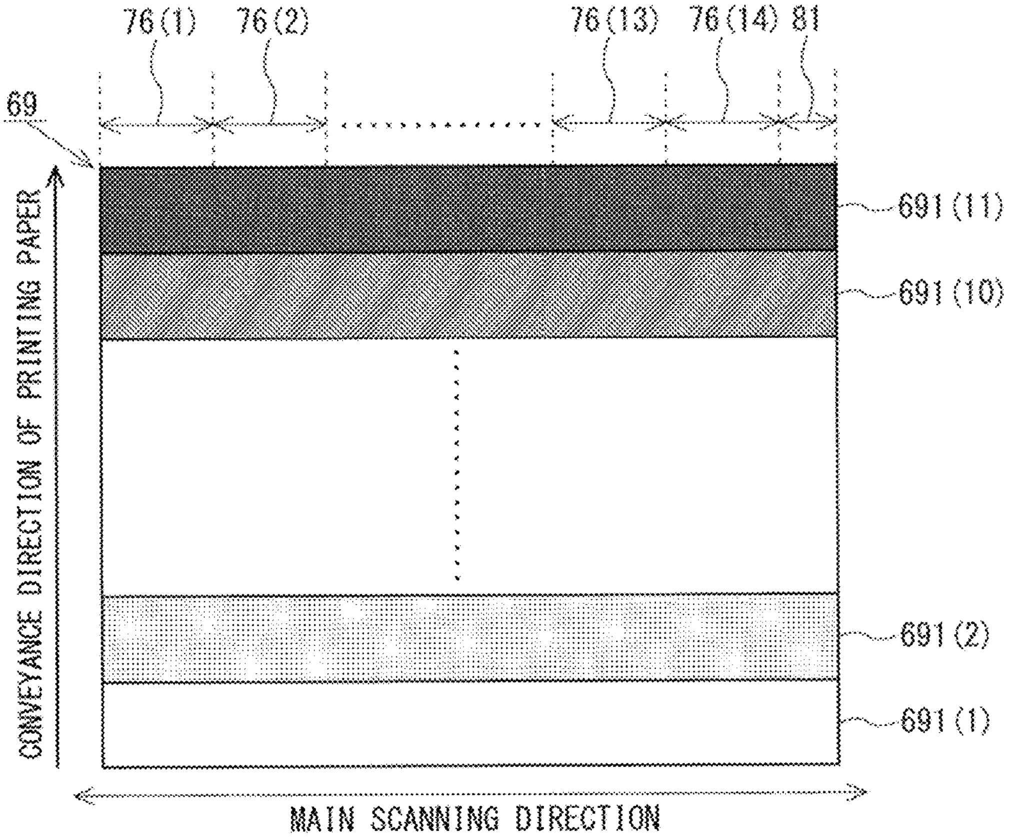
FIG. 21 is a schematic diagram illustrating a compensation coefficient calculation chart for one color and one sheet for a region corresponding to one ink ejection head in the embodiment.
Figure 22:
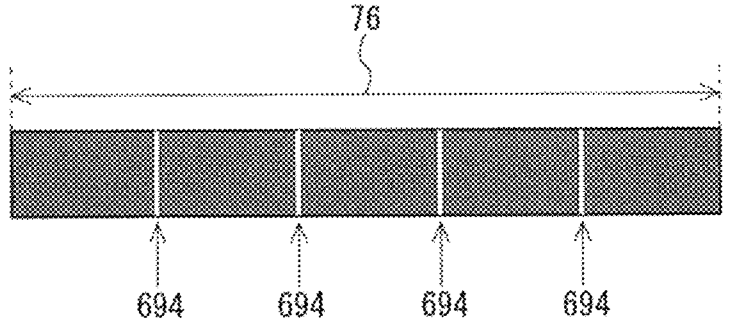
FIG. 22 is a schematic diagram illustrating a portion corresponding to one comparison region for one density with respect to the compensation coefficient calculation chart in the embodiment.

FIG. 21 is a schematic diagram illustrating the compensation coefficient calculation chart 69 for one color and one sheet for a region corresponding to one ink ejection head 251. The compensation coefficient calculation chart 69 is an image in which the density changes stepwise in the conveyance direction (sub-scanning direction) of the printing paper 5. In this regard, in the present embodiment, it is assumed that the density changes in 11 stages. Specifically, in FIG. 21, the density of a portion denoted by reference sign 691(1) is 5%, the density of a portion denoted by reference sign 691(2) is 10%, the density of a portion denoted by reference sign 691(10) is 90%, and the density of a portion denoted by reference sign 691(11) is 100%. The density changes in increments of 10% between the portion denoted by reference sign 691(2) and the portion denoted by reference sign 691(10). Furthermore, as illustrated in FIG. 21, the compensation coefficient calculation chart 69 includes portions respectively corresponding to the 14 comparison regions 76(1) to 76(14) and a portion corresponding to a normal region 81. As illustrated in FIG. 22, a portion corresponding to one comparison region 76 for one density includes portions 694 corresponding to four tentative defective nozzles. Note that the change in the density in the compensation coefficient calculation chart 69 is not limited to 11 stages. Assuming that M is an integer of 2 or more, the compensation coefficient calculation chart 69 may include M density regions corresponding to M densities different from each other in the conveyance direction of the printing paper 5.

In step S120, the compensation coefficient calculation chart data 53 representing the compensation coefficient calculation chart 69 as described above is generated by performing the ink amount compensation process on the image data having a constant density in the main scanning direction while applying the 14 provisional compensation coefficients to the 14 comparison regions 76(1) to 76(14), respectively.

Figure 23:
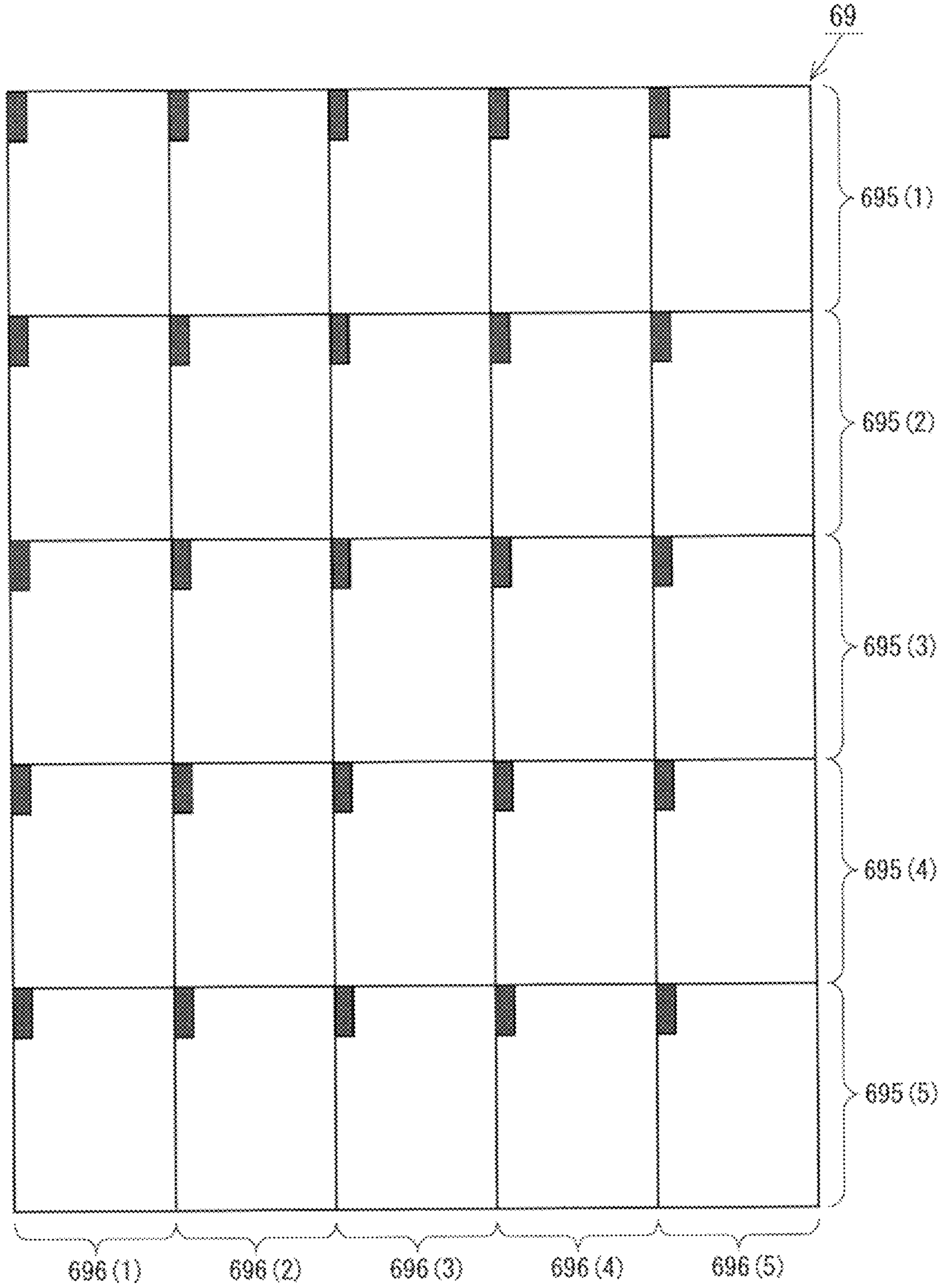
FIG. 23 is a diagram for explaining a case where the same nozzle is set as a tentative defective nozzle for all of five sheets in the embodiment.
Figure 24:
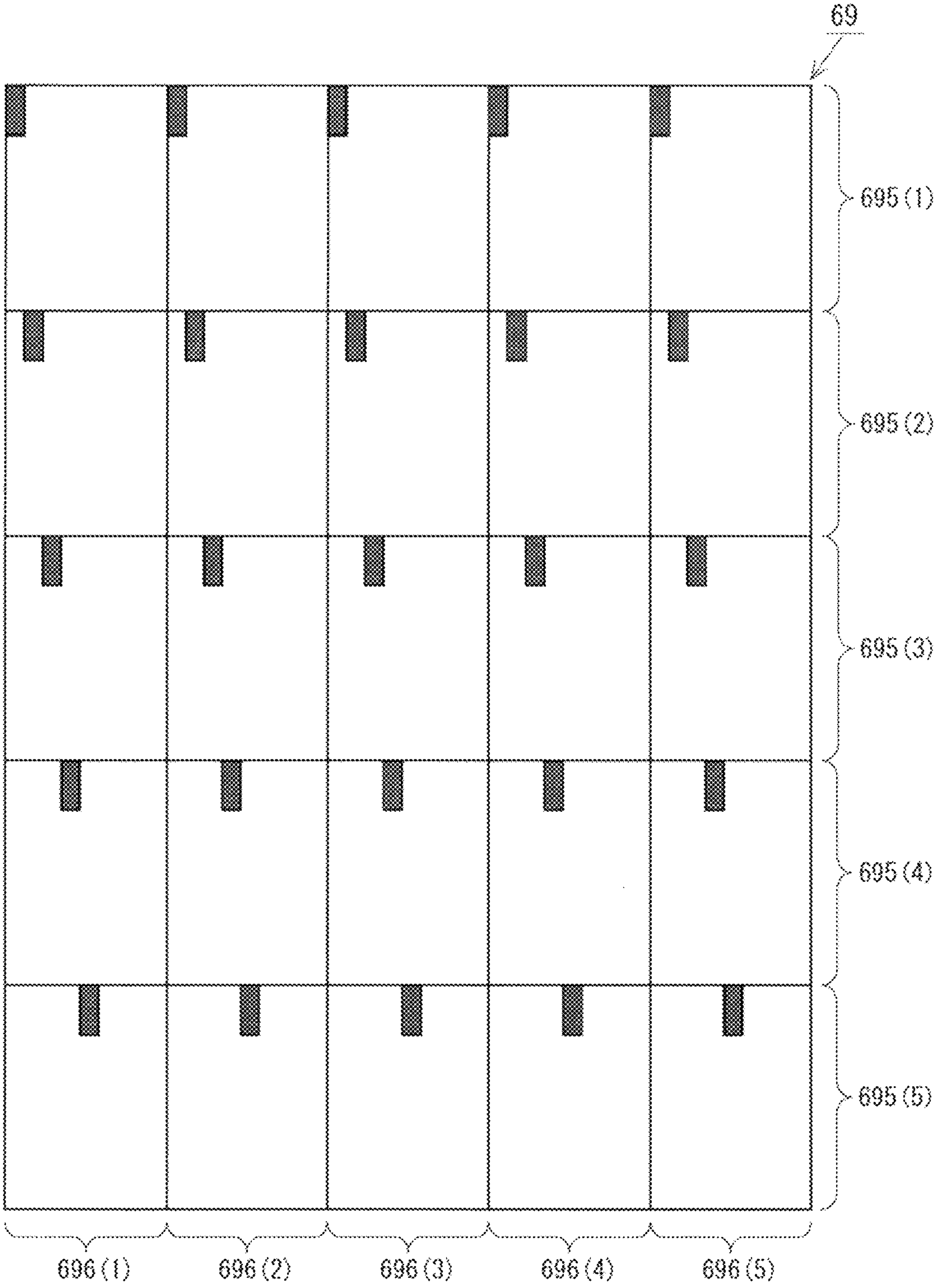
FIG. 24 is a diagram for explaining a case where different nozzles are set as tentative defective nozzles for each sheet in the embodiment.

Regarding each combination of the ink ejection head 251 and the density, the same nozzle may be set as the tentative defective nozzle for all of the five sheets, or different nozzles may be set as the tentative defective nozzles for each sheet. In a case where the same nozzle is set as a tentative defective nozzle for all of the five sheets, when shading is applied to a region (comparison region) corresponding to a certain provisional compensation coefficient for the maximum density among the entire region of the compensation coefficient calculation chart 69, a state as illustrated in FIG. 23 is obtained. On the other hand, in a case where different nozzles are set as the tentative defective nozzles for each sheet, when shading is applied to a region (comparison region) corresponding to a certain provisional compensation coefficient for the maximum density among the entire region of the compensation coefficient calculation chart 69, a state as illustrated in FIG. 24 is obtained. Note that, in FIGS. 23 and 24, regions denoted by reference signs 695(1) to 695(5) represent regions corresponding to the 1st to 5th sheets, respectively, and regions denoted by reference signs 696(1) to 696(5) represent regions corresponding to the 1st to 5th ink ejection heads 251, respectively. In a case where different nozzles are set as the tentative defective nozzles for each sheet (see FIG. 24), the influence of the variation in the ejection amount of ink among the plurality of nozzles can be more effectively suppressed.

Figure 25:
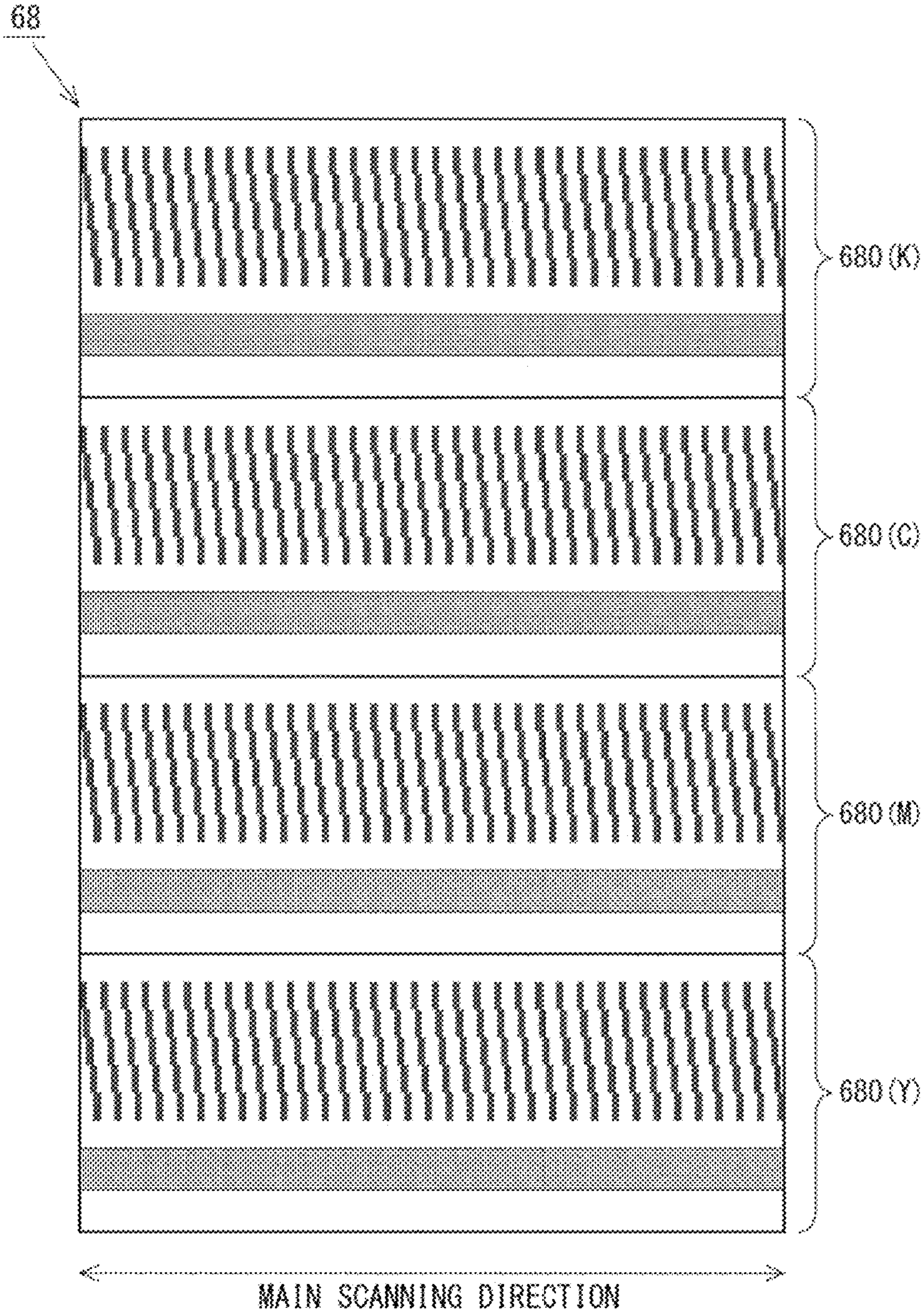
FIG. 25 is a schematic diagram illustrating an entire ejection defect detection chart according to the embodiment.
Figure 26:
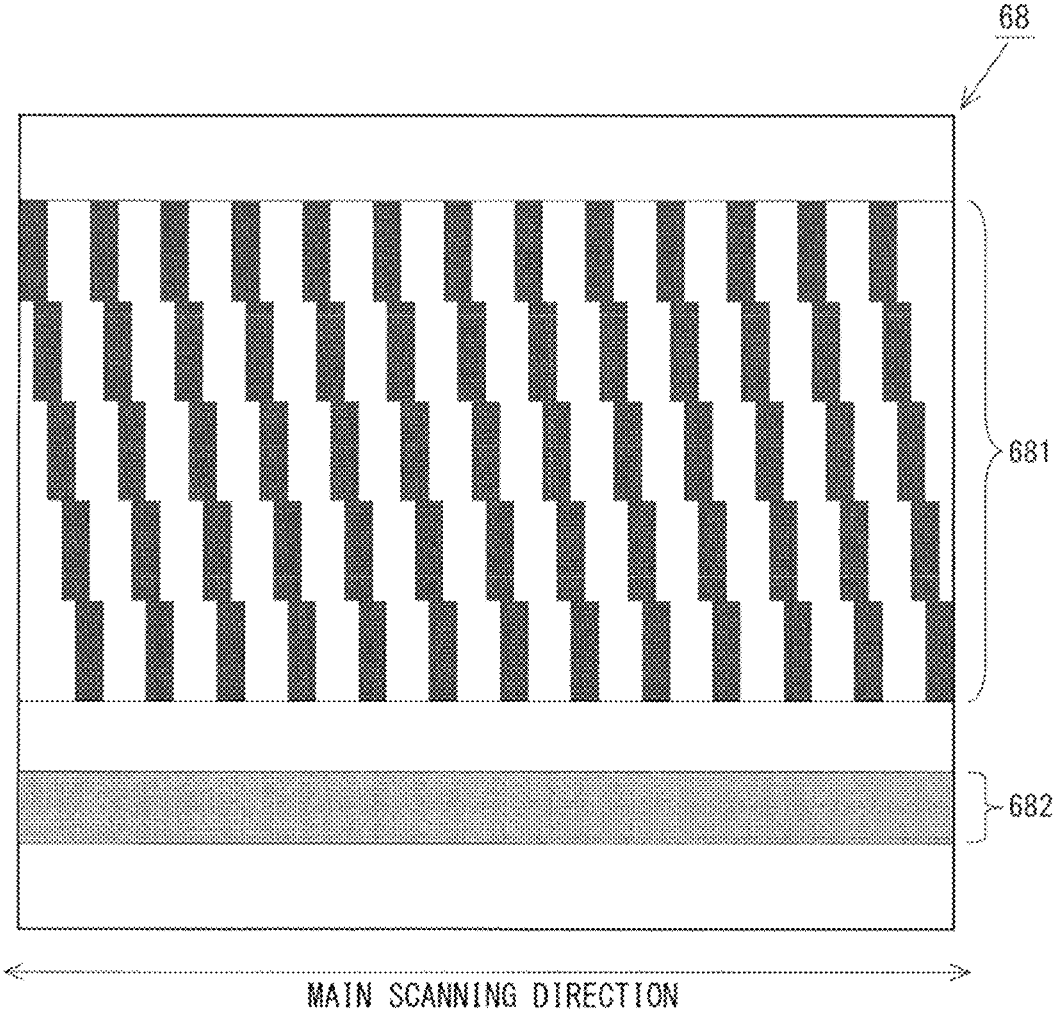
FIG. 26 is a schematic diagram illustrating an ejection defect detection chart for one color in the embodiment.

After the compensation coefficient calculation chart data 53 is generated, an ejection defect detection chart for detecting an ejection defect nozzle is printed (step S130). FIG. 25 is a schematic diagram illustrating an entire ejection defect detection chart 68. As illustrated in FIG. 25, the ejection defect detection chart 68 includes a portion 680(K) corresponding to the K color, a portion 680(C) corresponding to the C color, a portion 680(M) corresponding to the M color, and a portion 680(Y) corresponding to the Y color. FIG. 26 is a schematic diagram illustrating the ejection defect detection chart 68 for one color. The ejection defect detection chart 68 includes a portion 681 representing a stepwise pattern to be formed by ejecting ink from all the nozzles in one head unit 25 and a portion 682 representing a tint pattern having a constant density as a whole to be formed by ejecting ink from all the nozzles in one head unit 25. In step S130, the ejection defect detection chart 68 as described above is printed by controlling the ejection of ink from each nozzle included in each ink ejection head 251 constituting the recording unit 205 based on the ejection defect detection chart data 52. Note that the ejection defect detection chart data 52 is held in advance in the auxiliary storage device 121 in the print control device 100.

Figure 27:
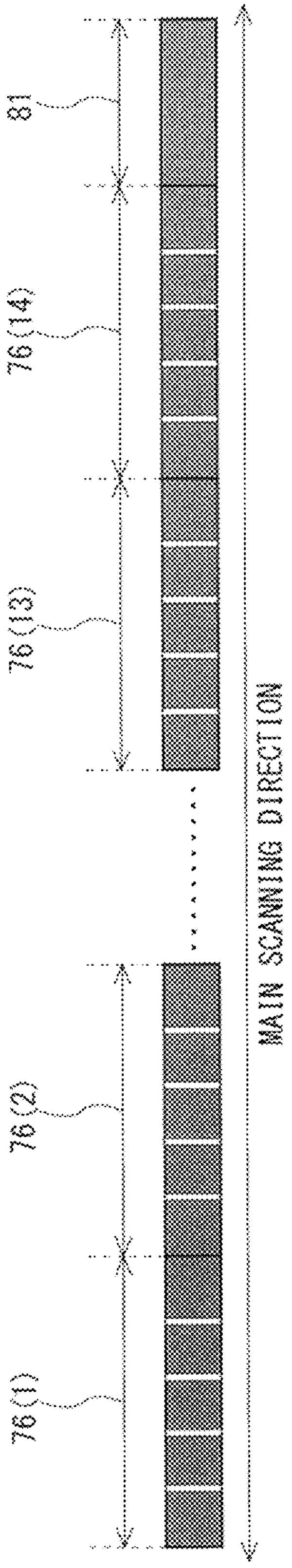
FIG. 27 is a schematic diagram illustrating a portion corresponding to one ink ejection head and one density in a printed compensation coefficient calculation chart in the embodiment.

After the ejection defect detection chart 68 is printed, the ejection of ink from each nozzle included in each ink ejection head 251 constituting the recording unit 205 is controlled on the basis of the compensation coefficient calculation chart data 53 generated in step S120, whereby the compensation coefficient calculation chart 69 is printed (step S140). The portion corresponding to one ink ejection head 251 and one density in the compensation coefficient calculation chart 69 printed in step S140 is, for example, as illustrated in FIG. 27. The image of the portion illustrated in FIG. 27 includes images corresponding to the 14 comparison regions 76(1) to 76(14) and an image corresponding to the normal region 81.

After the compensation coefficient calculation chart 69 is printed, the ejection defect detection chart 68 printed on the printing paper 5 in step S130 is imaged by the inline scanner 40 (step S150), and further, the compensation coefficient calculation chart 69 printed on the printing paper 5 in step S140 is imaged by the inline scanner 40 (step S160). In step S150, the first imaging data 54 is obtained, and in step S160, the second imaging data 55 is obtained.

Figure 28:
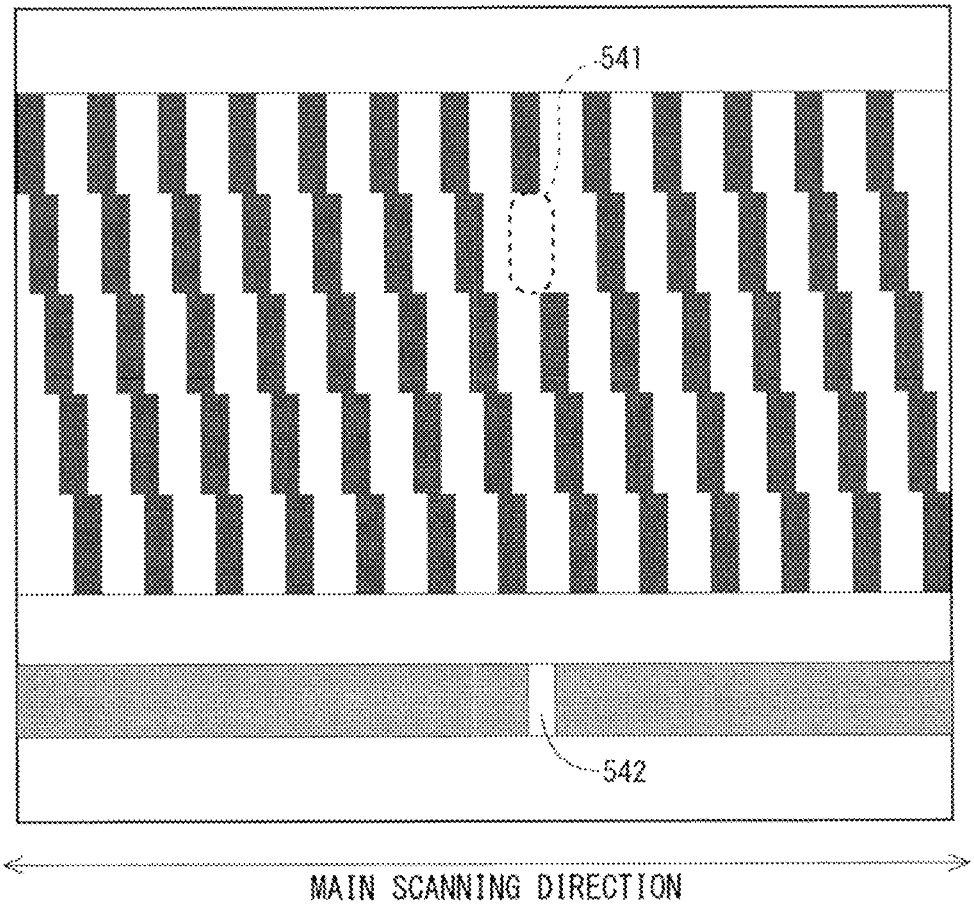
FIG. 28 is a diagram illustrating an example of an image represented by first imaging data in a case where an ejection defect nozzle is present in the embodiment.

Thereafter, the ejection defect nozzle detection unit 521 detects an ejection defect nozzle in which non-ejection, shape defects, side skipping, and the like occur, based on the first imaging data 54 obtained in step S150 (step S170). By the way, if an ejection defect nozzle is not present, the image represented by the first imaging data 54 is an image as illustrated in FIG. 26. On the other hand, in a case where an ejection defect nozzle is present, the image represented by the first imaging data 54 is, for example, an image as illustrated in FIG. 28. In the example illustrated in FIG. 28, the linear pattern is not normally printed in the portion denoted by reference sign 541 (that is, non-ejection occurs). Furthermore, the tint pattern is not normally printed in the portion denoted by reference sign 542 corresponding to the ejection defect in the portion denoted by reference sign 541. As above, in a case where an ejection defect nozzle is present, a tint pattern is not normally printed in a portion corresponding to the ejection defect nozzle. Thus, in step S170, an ejection defect nozzle is detected based on the first imaging data 54. Note that hereinafter, the ejection defect nozzle detected in step S170 is referred to as a "true defective nozzle".

Next, the sample image data extraction unit 522 extracts, for each ink color, 14 pieces of sample image data 64 corresponding to the 14 comparison regions 76 set for determining the compensation coefficient 62 from the second imaging data 55 obtained in step S160 (step S180). Furthermore, in the present embodiment, in step S180, the sample image data extraction unit 522 further extracts, for each ink color, the normal region data 65 corresponding to the normal region 81 from the second imaging data 55.

Figure 29:
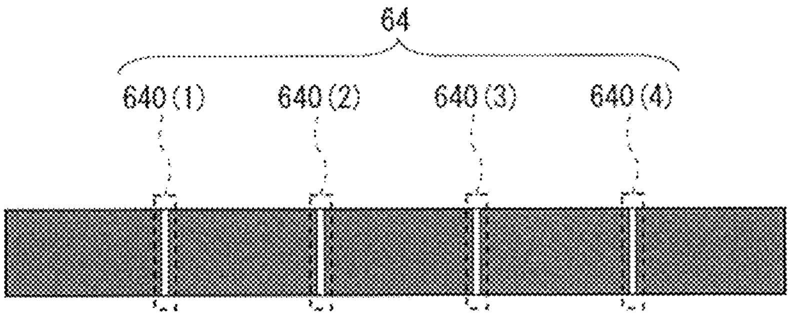
FIG. 29 is a diagram for explaining sample image data in the embodiment.

In the present embodiment, as illustrated in FIG. 29, each of the 14 pieces of sample image data 64 includes four pieces of partial image data 640(1) to 640(4) corresponding to the four tentative defective nozzles 80 (see FIG. 19). In other words, each of the 14 pieces of sample image data 64 includes data of four luminance values.

Figure 30:
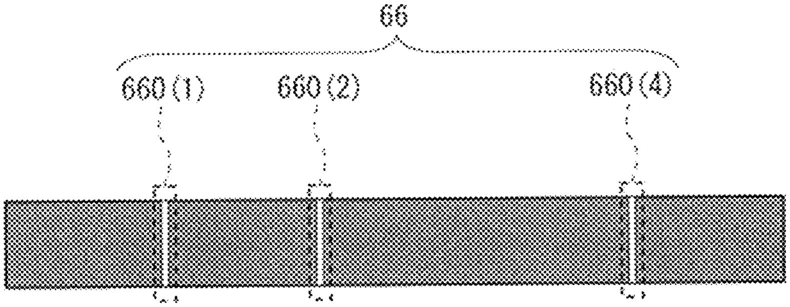
FIG. 30 is a diagram for explaining sample image data after data deletion in the embodiment.

After completion of step S180, the data deletion unit 523 deletes data (data of the luminance value) corresponding to the position of the true defective nozzle (the ejection defect nozzle detected in step S170) from the 14 pieces of sample image data 64 (step S190). In this regard, in the present embodiment, for example, when the region of the partial image data 640(3) among the four pieces of partial image data 640(1) to 640(4) constituting one piece of sample image data 64 corresponds to the position of the true defective nozzle, the partial image data 640(3) is deleted from the four pieces of partial image data 640(1) to 640(4). Therefore, in this example, the sample image data 66 after the end of step S190 includes partial image data 640(1), partial image data 640(2), and partial image data 640(4), as illustrated in FIG. 30.

Figure 31:
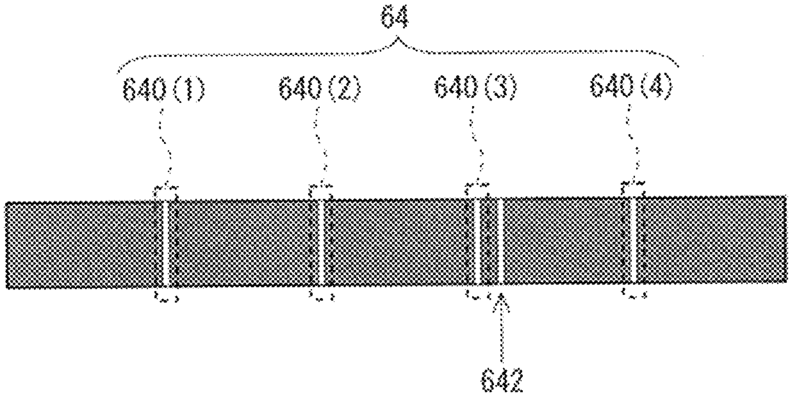
FIG. 31 is a diagram for explaining a case where a position of an ejection defect nozzle is close to a region of partial image data in the embodiment.

Note that, even in a case where the position of the ejection defect nozzle does not correspond to the region of the partial image data constituting the sample image data 64, in a case where the presence of the ejection defect nozzle affects the luminance value of the partial image data, the corresponding partial image data is deleted in step S190. For example, when the position 642 of the ejection defect nozzle does not correspond to the region of the partial image data 640(3) but is close to the region of the partial image data 640(3) as illustrated in FIG. 31, the presence of the ejection defect nozzle affects the luminance value of the partial image data 640(3). Therefore, even in such a case, in step S190, the partial image data 640(3) is deleted from the four pieces of partial image data 640(1) to 640(4).

As described above, in the present embodiment, in step S190, for each of the 14 pieces of sample image data 64, the partial image data affected by the true defective nozzle is deleted from the four pieces of partial image data 640(1) to 640(4).

After the end of step S190, based on the 14 pieces of sample image data 66 and the normal region data 65, the function generation unit 524 generates a function representing a correspondence relationship between the coefficient values including the 14 provisional compensation coefficients and the luminance differences between the measured luminance value (luminance value in the sample image data 66) and the target luminance value (luminance value in the normal region data 65) (step S200). In the present embodiment, in step S200, as described above, a nonlinear function such as a quadratic function or an exponential function is generated as a function representing the correspondence relationship between the coefficient values and the luminance differences. That is, in step S200, the values of the coefficients a, b, and c in the above Formula (2) or the above Formula (3), for example, are determined.

Finally, the coefficient calculation unit 525 calculates the compensation coefficient 62 to be actually applied to the ink amount compensation process using the function (nonlinear function) generated in step S200 (step S210). Specifically, regarding the above Formula (2) or the above Formula (3) in which the values of the coefficients a, b, and c are determined, the value of X when Y is 0 is calculated. In this regard, in a case where it is difficult to analytically obtain the value of X, for example, an approximate value of X may be obtained using the Newton method, and the approximate value may be adopted as the compensation coefficient 62.

In step S200, a function (nonlinear function) is generated for each density (in the present embodiment, every 11 levels image constituting the of density) of the compensation coefficient calculation chart 69. Then, in step S210, the compensation coefficient 62 is calculated using the corresponding function for each of density the image constituting the compensation coefficient calculation chart 69. The compensation coefficient 62 corresponding to a density between the density of a certain stage and the density of a stage adjacent thereto can be obtained using, for example, linear interpolation. For example, the compensation coefficient 62 for a density of 62% is determined by linear interpolation using a compensation coefficient 62 for a density of 60% and a compensation coefficient 62 for a density of 70%.

Note that, in the present embodiment, setting a plurality of divided regions is realized by step S100, setting the tentative defective nozzle is realized by step S110, generating compensation coefficient calculation chart data is realized by step S120, printing an ejection defect detection chart is realized by step S130, printing the compensation coefficient calculation chart is realized by step S140, imaging the ejection defect detection chart is realized by step S150, acquiring imaging data is realized by step S160, detecting a nozzle in an ejection defect state is realized by step S170, extracting K pieces of sample image data and normal region data is realized by step S180, deleting data is realized by step S190, generating a function is realized by step S200, and calculating the compensation coefficient is realized by step S210.

7. Effects

According to the present embodiment, 14 provisional compensation coefficients are prepared as various compensation coefficients, and a function representing a correspondence relationship between coefficient values including the 14 provisional compensation coefficients and luminance differences between a measured luminance value (luminance value in the sample image data 66) and a target luminance value (luminance value in the normal region data 65) is obtained on the basis of data obtained by applying the 14 provisional compensation coefficients to the ink amount compensation process. Based on the function, the coefficient value at which the luminance difference becomes 0 is calculated as the compensation coefficient 62 to be applied to the ink amount compensation process. Thus, the compensation coefficient 62 actually applied to the ink amount compensation process is determined using a function based on data obtained by applying the provisional compensation coefficient to the ink amount compensation process. Therefore, the suitable compensation coefficient 62 is obtained. From the above, according to the present embodiment, with respect to the inkjet printing apparatus 10, the defect of the print image in a case where the ejection defect nozzle is present is more accurately corrected than before. By the way, since the optical dot gain is different between the region where the white streak appears due to the small value of the provisional compensation coefficient and the region where the black streak appears due to the large value of the provisional compensation coefficient, the suitable compensation coefficient 62 can be accurately obtained by using the nonlinear function as in the present embodiment. Furthermore, since the defect of the print image is accurately corrected, the necessity of reprinting is reduced. As a result, wasteful consumption of ink and printing paper 5 is reduced, so that it is possible to contribute to the achievement of SDGs (sustainable development goals).

8. Modifications

Hereinafter, modifications of the above embodiment will be described.

<8.1 Modification Regarding Calculation of Compensation Coefficient>

In the above embodiment, a nonlinear function is generated using the imaging data of the compensation coefficient calculation chart 69, and a coefficient value at which the luminance difference (difference between the measured luminance value and the target luminance value) becomes 0 based on the nonlinear function is calculated as the compensation coefficient 62 to be applied to the ink amount compensation process. However, the present invention is not limited thereto. Therefore, two modifications (a first modification and a second modification) related to the calculation of the compensation coefficient will be described below.

<8.1.1 First Modification>

In the present modification, a linear function is used as a function for calculating the compensation coefficient 62. Generally, the time required for the process based on the linear function is shorter than the time required for the process based on the nonlinear function. Therefore, for example, in a case where the reduction of the processing time is prioritized over the accuracy of the correction of the defect of the print image, a linear function may be used as a function for calculating the compensation coefficient 62 as in the present modification. More specifically, a linear function represented by the following Formula (4) may be used.

$$Y = aX + b \quad (4)$$

Here, X represents a coefficient value (a value of a compensation coefficient), Y represents a luminance difference, and a and b represent coefficients in a linear function.

Figure 18:
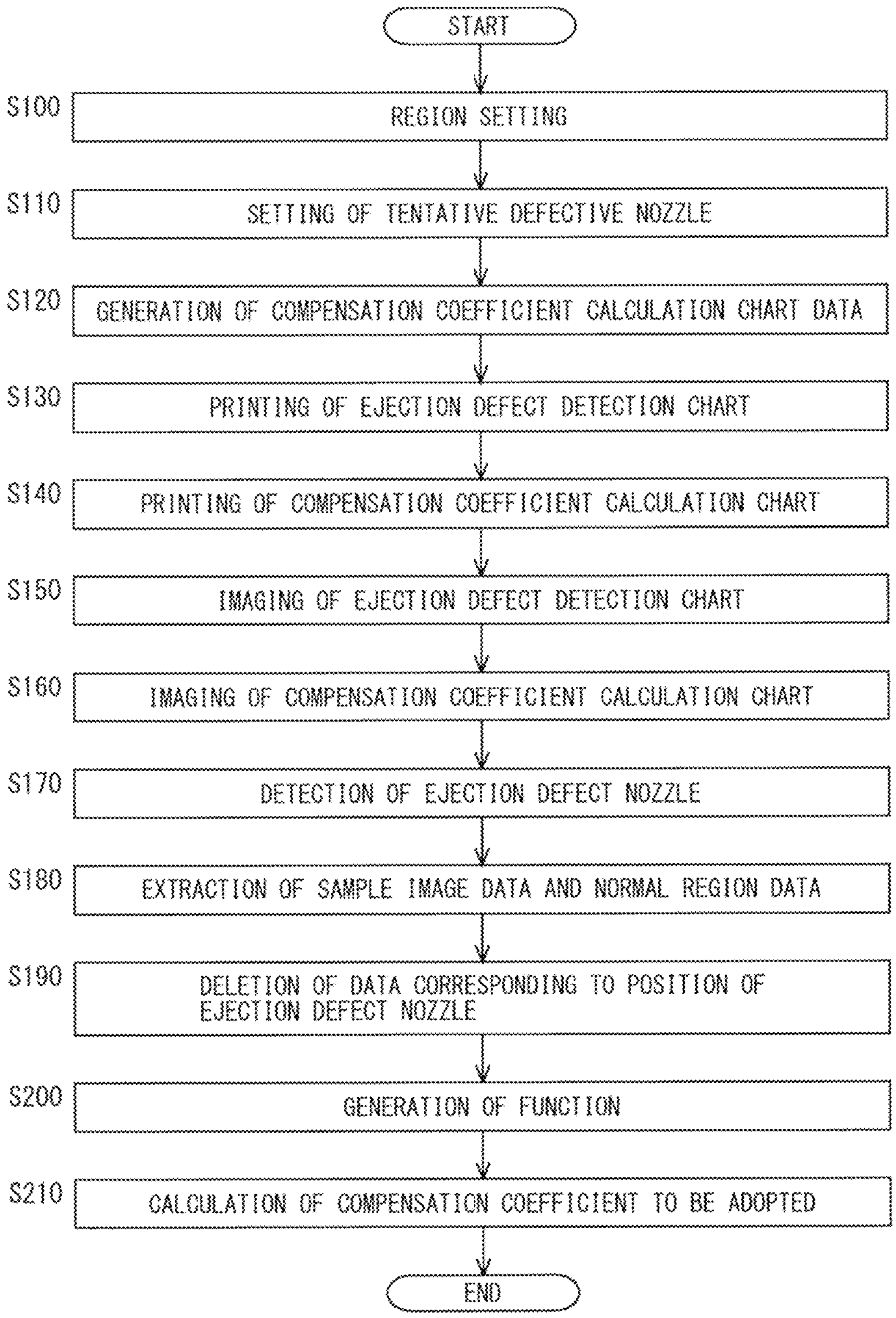
FIG. 18 is a flowchart illustrating a process procedure for determining a compensation coefficient in the embodiment.
Figure 32:
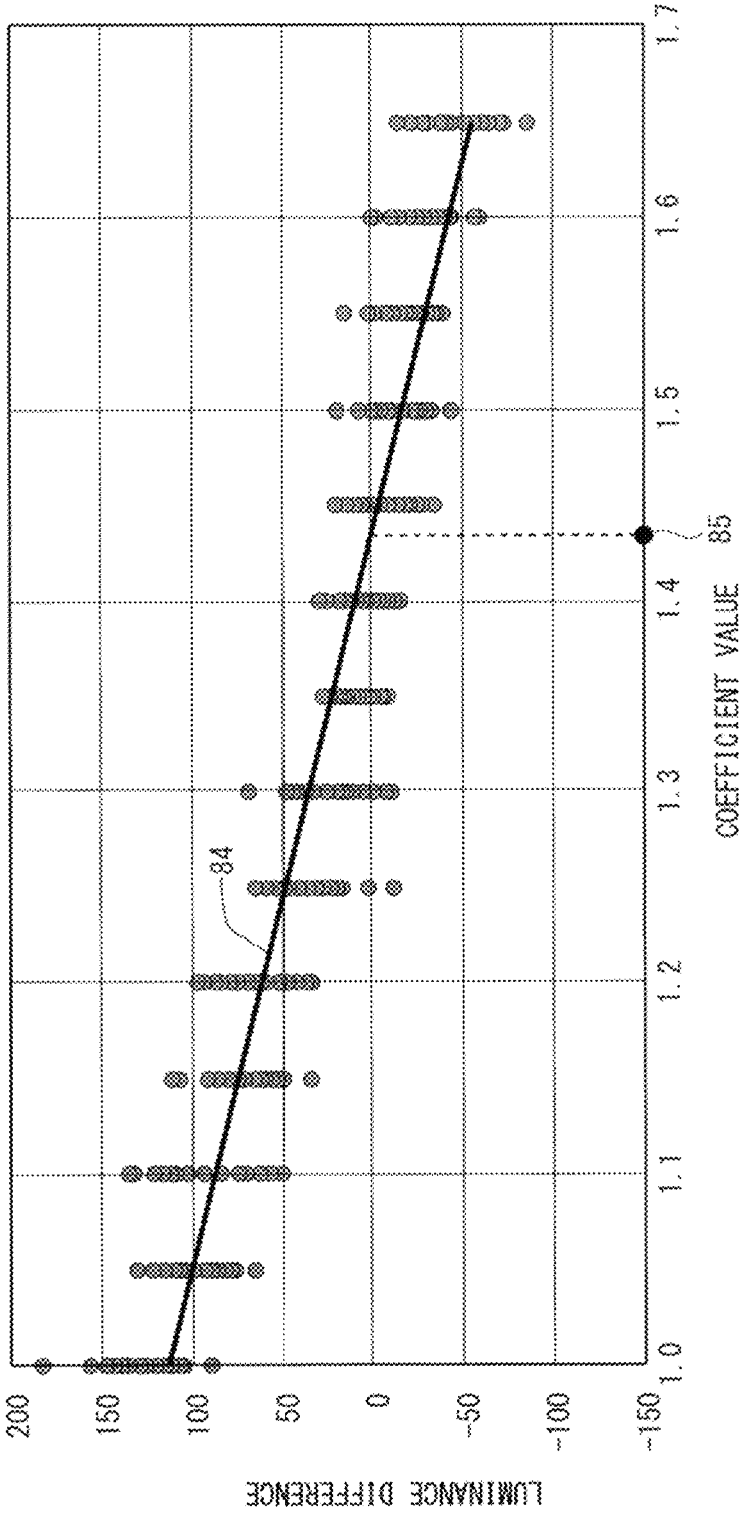
FIG. 32 is a diagram illustrating an example of a straight line representing a linear function obtained on the basis of data of luminance differences in a first modification of the embodiment.

In a case where the graph illustrated in FIG. 16 is obtained when the data of the luminance differences obtained with respect to the above-described 14 provisional compensation coefficients is plotted on a plane in which the horizontal axis represents the coefficient value and the vertical axis represents the luminance difference, according to the present modification, in step S200 of FIG. 18, for example, a linear function represented by a straight line denoted by reference sign 84 in FIG. 32 is generated. Then, in step S210 of FIG. 18, the coefficient value at which the luminance difference becomes 0 based on the linear function is obtained. In the example illustrated in FIG. 32, the coefficient value at which the luminance difference is 0 is a value of a black spot portion denoted by reference sign 85. Therefore, in this case, the value (coefficient value) of the black spot portion is determined as the compensation coefficient 62 to be actually applied to the ink amount compensation process.

Note that, in a case where a linear function is adopted as a function for calculating the compensation coefficient 62 as in the present modification, at least two provisional compensation coefficients may be prepared.

<8.1.2 Second Modification>

In the embodiment described above, the time required for the process of calculating the compensation coefficient 62 actually applied to the ink amount compensation process using the nonlinear function (the process of step S210 in FIG. 18) may become significantly long. Therefore, in the present modification, a nonlinear function and a linear function are used so that a suitable compensation coefficient 62 can be obtained accurately in a short time. Details will be described below.

Figure 33:
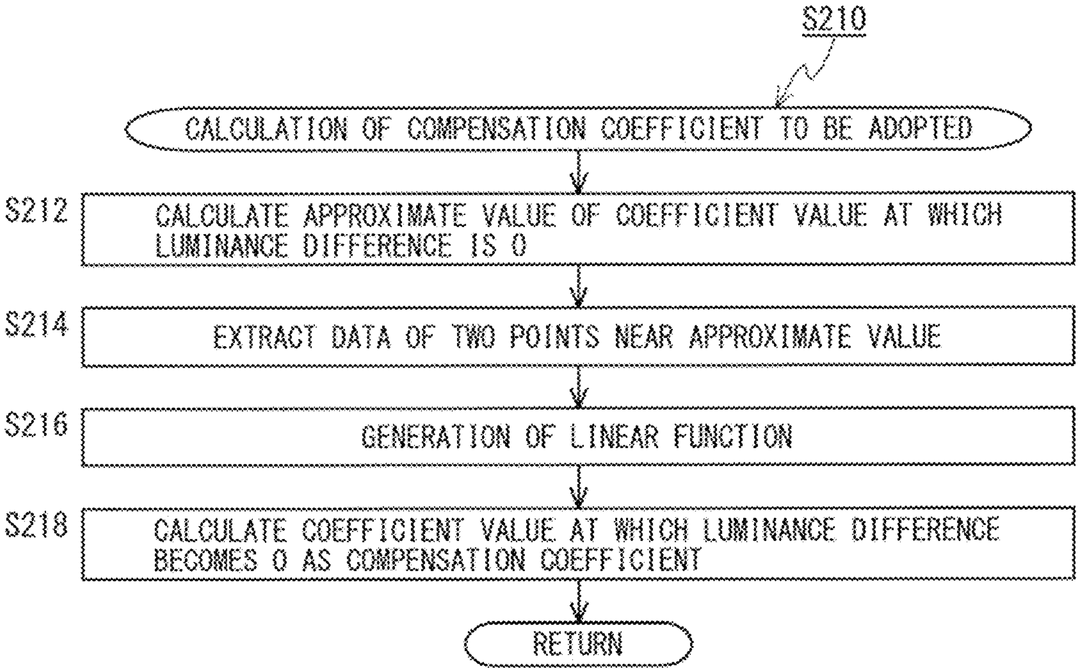
FIG. 33 is a flowchart illustrating a detailed procedure of a process of calculating a compensation coefficient to be adopted in a second modification of the embodiment.

FIG. 33 is a flowchart illustrating a detailed procedure of the process of calculating the compensation coefficient 62 to be adopted (the process of step S210 of FIG. 18). Note that, in step S200 in FIG. 18, a nonlinear function is generated in the same manner as in the above embodiment.

First, an approximate value of the coefficient value at which the luminance difference is 0 based on the nonlinear function generated in step S200 is calculated (step S212). Then, the approximate value calculated in step S212 is treated as a tentative compensation coefficient. Note that the approximate value can be calculated by, for example, Newton's method.

Figure 34:
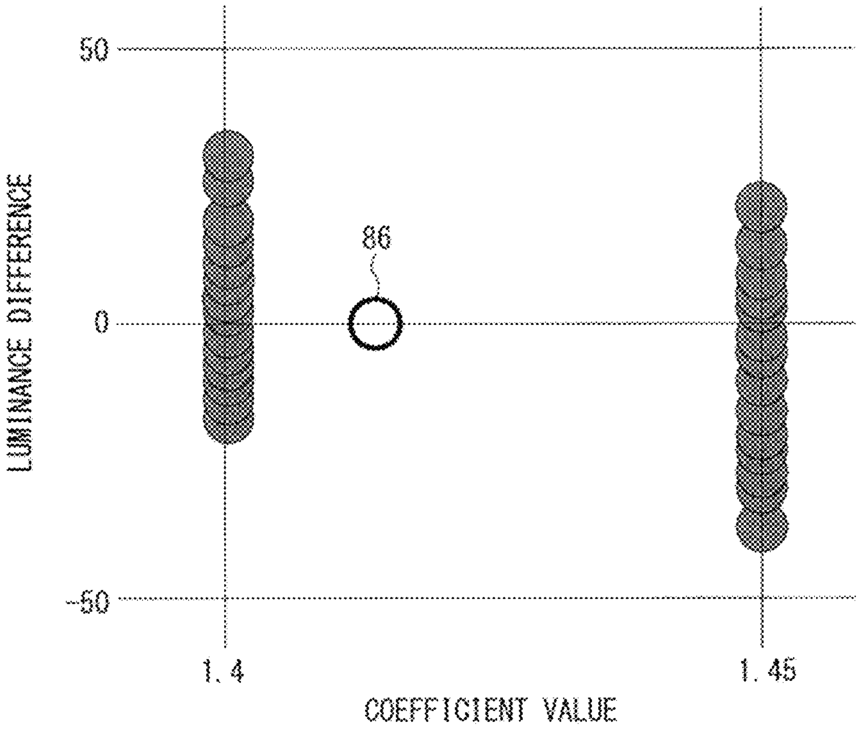
FIG. 34 is a diagram for explaining extraction of sample image data corresponding to a provisional compensation coefficient in the vicinity of a tentative compensation coefficient in the second modification.

Next, assuming that Q is an integer of 2 or more, Q pieces of sample image data 66 corresponding to Q provisional compensation coefficients near the tentative compensation coefficient (the approximate value calculated in step S212) are extracted from 14 pieces of sample image data 66 after the end of step S190 in FIG. 18 (step S214). Here, it is assumed that two pieces of sample image data 66 are extracted in step S214. In this case, if the position of the portion denoted by reference sign 86 in FIG. 34 corresponds to the position of the tentative compensation coefficient, sample image data 66 corresponding to "provisional compensation coefficient: 1.4" and sample image data 66 corresponding to "provisional compensation coefficient: 1.45" are extracted from the 14 pieces of sample image data 66. In this manner, the sample image data 66 corresponding to the largest provisional compensation coefficient among the provisional compensation coefficients less than the tentative compensation coefficient and the sample image data 66 corresponding to the smallest provisional compensation coefficient among the provisional compensation coefficients larger than the tentative compensation coefficient are extracted.

Figure 35:
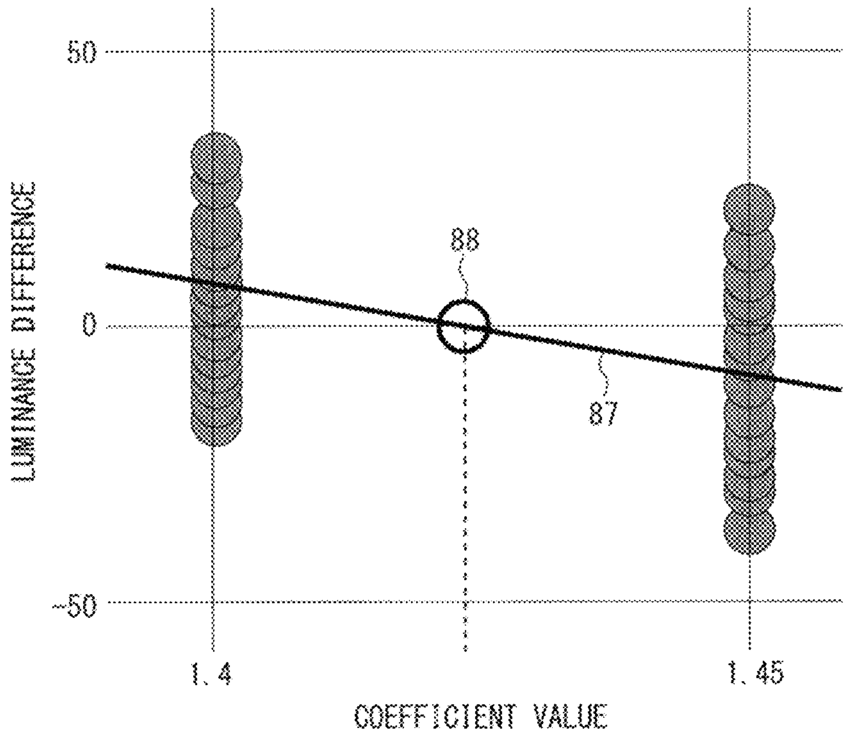
FIG. 35 is a diagram for explaining generation of a linear function representing a correspondence relationship between coefficient values and luminance differences in the second modification.

Thereafter, based on the Q pieces of sample image data 66 extracted in step S214 and the normal region data 65 described above, a linear function representing a correspondence relationship between coefficient values and luminance differences (differences between a luminance value in the sample image data and a luminance value in the normal region data) is generated (step S216). In the above example, based on the sample image data 66 corresponding to "provisional compensation coefficient: 1.4", the sample image data 66 corresponding to "provisional compensation coefficient: 1.45", and the normal region data 65, a linear function represented by a straight line denoted by reference sign 87 in FIG. 35 is generated, for example.

Finally, a coefficient value at which the luminance difference becomes 0 based on the linear function generated in step S216 is calculated as the compensation coefficient 62 actually applied to the ink amount compensation process (step S218). In the example illustrated in FIG. 35, the coefficient value at a position of a portion denoted by reference sign 88 is a coefficient value at which the luminance difference becomes 0. Therefore, in this case, the coefficient value at the position of the portion denoted by reference sign 88 is determined as the compensation coefficient 62 to be actually applied to the ink amount compensation process.

Meanwhile, in the above example, in step S214 in FIG. 33, two pieces of sample image data 66 are extracted from the Q pieces of sample image data 66. That is, in order to obtain a linear function for use in final determination of the compensation coefficient 62, data of two points near the tentative compensation coefficient is extracted. However, in order to obtain the linear function, data of three points near the tentative compensation coefficient may be extracted, or data of four or more points near the tentative compensation coefficient may be extracted. In this regard, in a case of extracting data of three points near the tentative compensation coefficient, sample image data 66 corresponding to a largest provisional compensation coefficient among provisional compensation coefficients less than the tentative compensation coefficient, sample image data 66 corresponding to a smallest provisional compensation coefficient among provisional compensation coefficients larger than the tentative compensation coefficient, and sample image data 66 corresponding to a provisional compensation coefficient close to the tentative compensation coefficient among a provisional compensation coefficient that is second largest among provisional compensation coefficients less than the tentative compensation coefficient and a compensation provisional coefficient that is second smallest among provisional compensation coefficients larger than the tentative compensation coefficient are extracted (it is assumed that the tentative compensation coefficient does not match any provisional compensation coefficient.). For example, when the tentative compensation coefficient is 1.43, sample image data 66 corresponding to "provisional compensation coefficient: 1.4", sample image data 66 corresponding to "provisional compensation coefficient: 1.45", and sample image data 66 corresponding to "provisional compensation coefficient: 1.5" are extracted. When the tentative compensation coefficient is 1.42, sample image data 66 corresponding to "provisional compensation coefficient: 1.4", sample image data 66 corresponding to "provisional compensation coefficient: 1.45", and sample image data 66 corresponding to "provisional compensation coefficient: 1.35" are extracted. In a case where data of four points near the tentative compensation coefficient is extracted, sample image data 66 corresponding to the largest provisional compensation coefficient among provisional compensation coefficients less than the tentative compensation coefficient, sample image data 66 corresponding to the second largest provisional compensation coefficient among provisional compensation coefficients less than the tentative compensation coefficient, sample image data 66 corresponding to the smallest provisional compensation coefficient among provisional compensation coefficients greater than the tentative compensation coefficient, and sample image data 66 corresponding to the second smallest provisional compensation coefficient among provisional compensation coefficients greater than the tentative compensation coefficient are extracted (it is assumed that the tentative compensation coefficient does not match provisional compensation coefficient.). In a case where the data of five or more points near the tentative compensation coefficient is extracted, the sample image data 66 to be extracted may be determined similarly to the case of extracting the data of three points near the tentative compensation coefficient or the case of extracting the data of four points near the tentative compensation coefficient.

Note that the type of the function generated in step S200 in FIG. 18 is not particularly limited. However, the nonlinear function is more preferable than the linear function from the viewpoint of accurately correcting the defect of the print image. Furthermore, the type of the function generated in step S216 in FIG. 33 is not particularly limited. However, the linear function is more preferable than the nonlinear function from the viewpoint of shortening the processing time.

<8.2 Modification Regarding Setting of Regions (Third Modification)>

In the above embodiment, the regions are set such that the 14 comparison regions 76 associated with the 14 provisional compensation coefficients are arranged in the main scanning direction (direction orthogonal to the conveyance direction of the printing paper 5) (See FIGS. 19 and 21). However, the direction in which the plurality of comparison regions 76 are arranged is not limited to the main scanning direction, and the plurality of comparison regions 76 may be arranged in the conveyance direction of the printing paper 5.

Figure 36:
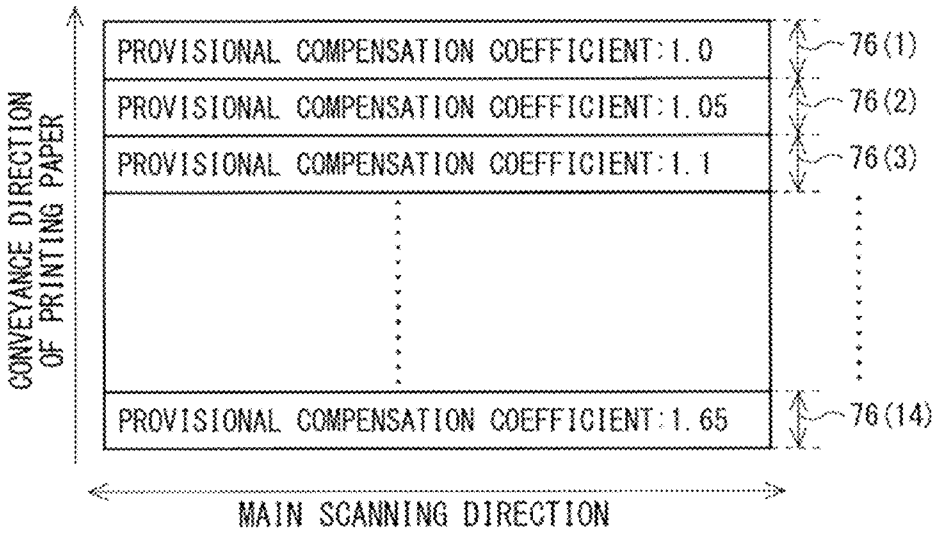
FIG. 36 is a diagram for explaining setting of a plurality of comparison regions in a third modification of the embodiment.
Figure 37:
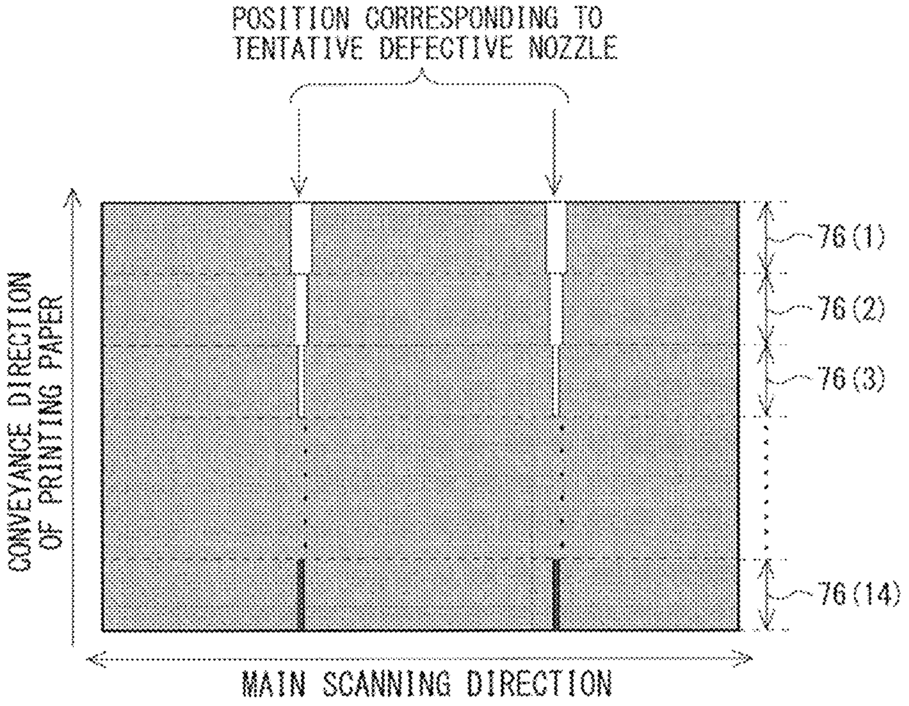
FIG. 37 is a diagram schematically illustrating a print image of a compensation coefficient calculation chart in the third modification.

In the present modification, for example, as illustrated in FIG. 36, the regions are set such that 14 comparison regions 76(1) to 76(14) from a comparison region 76(1) associated with "provisional compensation coefficient: 1.0" to a comparison region 76(14) associated with "provisional compensation coefficient: 1.65" are arranged in the conveyance direction of the printing paper 5. In this case, the print image of the corresponding portion of the compensation coefficient calculation chart 69 is schematically as illustrated in FIG. 37.

In the above embodiment, luminance value corresponding to only one provisional compensation coefficient is obtained for one tentative defective nozzle based on the imaging data (second imaging data 55) of the compensation coefficient calculation chart 69, whereas in the present modification, data luminance of values respectively corresponding to 14 provisional compensation coefficients is obtained for one tentative defective nozzle based on the imaging data (second imaging data 55) of the compensation coefficient calculation chart 69. Therefore, according to the present modification, the number of nozzles set as the tentative defective nozzles can be reduced as compared with the above embodiment.

<8.3 Modification Regarding Procedure of Series of Processes (Fourth Modification)>

In the above embodiment, regarding the series of processes (see FIG. 18) for determining the compensation coefficient 62, it is assumed that all of the processes from the process of setting 14 comparison regions and one normal region for each ink ejection head 251 to the process of finally calculating the compensation coefficient 62 are performed in one printing system (That is, all of the processes are performed by the user of the inkjet printing apparatus 10). However, the present invention is not limited thereto. It is also possible to adopt an operation in which the processes up to the generation of the compensation coefficient calculation chart data 53 (that is, the processes up to step S120 in FIG. 18) are performed by the manufacturer of the inkjet printing apparatus 10, and the processes after the process of printing the ejection defect detection chart 68 (the processes after step S130 in FIG. 18) are performed by the user of the inkjet printing apparatus 10.

Figure 38:
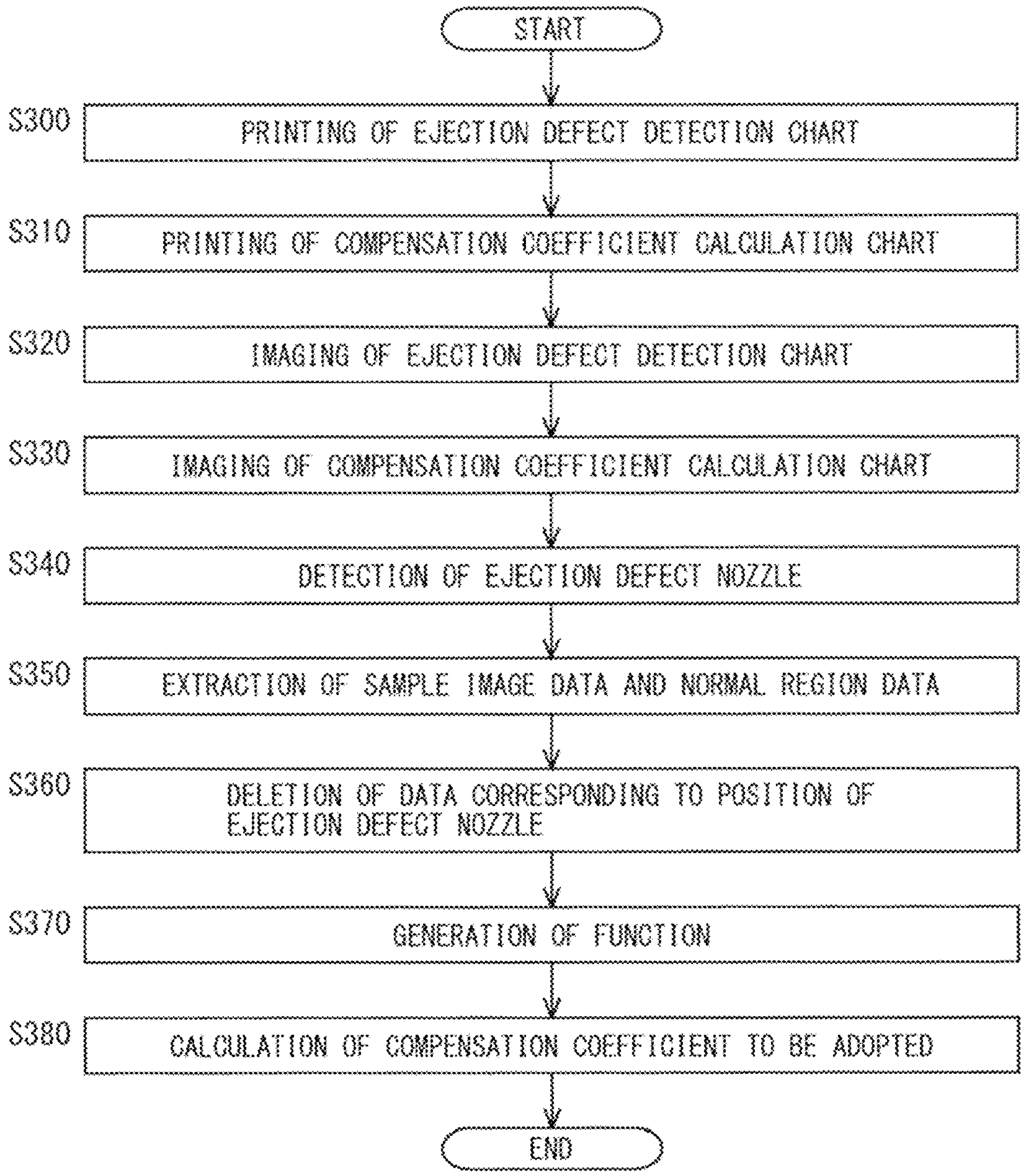
FIG. 38 is a flowchart illustrating a process procedure for determining a compensation coefficient in a fourth modification of the embodiment.
Figure 39:
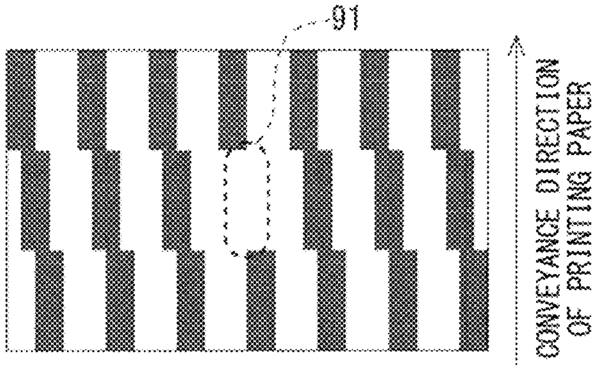
FIG. 39 is a diagram for explaining non-ejection.
Figure 40:
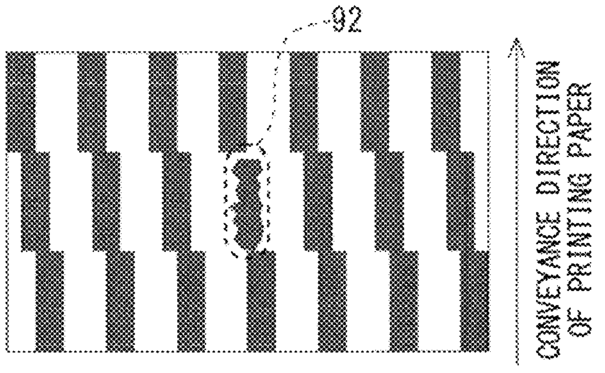
FIG. 40 is a diagram for explaining shape defects.
Figure 41:
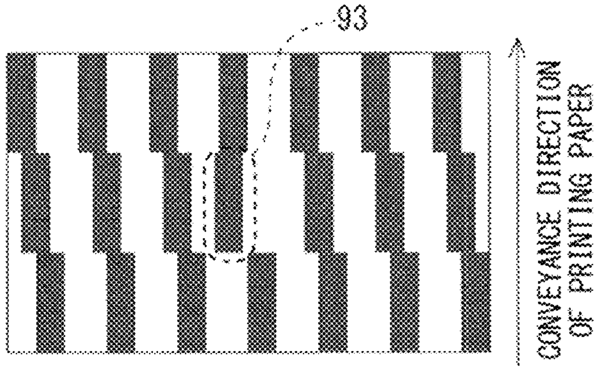
FIG. 41 is a diagram for explaining side skipping.

FIG. 38 is a flowchart illustrating a procedure of a process of determining the compensation coefficient 62 in the present modification. First, the ejection defect detection chart 68 is printed (step S300). Next, the ejection of ink from each nozzle included in each ink ejection head 251 constituting the recording unit 205 is controlled on the basis of the compensation coefficient calculation chart data 53, whereby the compensation coefficient calculation chart 69 is printed (step S310). In this regard, in the present modification, unlike the above embodiment, the compensation coefficient calculation chart data 53 representing the compensation coefficient calculation chart 69 is held in advance in the auxiliary storage device 121 in the print control device 100. The compensation coefficient calculation chart data 53 is generated by the manufacturer of the inkjet printing apparatus 10 performing the processes of steps S100 to S120 of FIG. 18. That is, in the manufacturer of the inkjet printing apparatus 10, 14 comparison regions 76 (each comparison region 76 corresponds to the tentative defective nozzle 80) associated with 14 provisional compensation coefficients different from each other and one normal region 81 are set for each ink ejection head 251, and the compensation coefficient calculation chart data 53 is generated by performing the ink amount compensation process on predetermined image data having a constant density in the main scanning direction while applying the 14 provisional compensation coefficients to the 14 comparison regions 76. After the generation of the compensation coefficient calculation chart data 53, processes (processes of steps S320 to S380 of FIG. 38) similar to the processes of steps S150 to S210 of FIG. 18 are performed.

Note that, in the present embodiment, printing a compensation coefficient calculation chart is realized by step S310, acquiring imaging data is realized by step S330, extracting K pieces of sample image data and normal region data is realized by step S350, generating a function is realized by step S370, and calculating the compensation coefficient is realized by step S380.

9. Supplement

Note that, in the above embodiment, the influence of the ejection defect is alleviated by correcting the density values of nozzles on both sides of a nozzle in the ejection defect state (for example, in a case where the nozzle denoted by reference sign 252(*p*) in FIG. 4 is a nozzle in the ejection defect state, the density values of the nozzles denoted by reference signs 252(*q*) and 252(*r*) in FIG. 4 are corrected). However, the nozzle the density value of which is corrected may be a nozzle in the vicinity of the nozzle in the ejection defect state in the main scanning direction and is not necessarily required to be adjacent to the nozzle in the ejection defect state. For example, the density value of the nozzle at a position separated by 2 or 3 nozzles in the main scanning direction from the nozzle in the ejection defect state may be corrected. Furthermore, the density value of not one nozzle but each of two or more nozzles may be corrected for one side in the main scanning direction. Moreover, in a case where the density value of each of two or more nozzles is corrected for one side in the main scanning direction, the nozzles may include a nozzle the density value of which is reduced.

In the above embodiment, the CPU 111 as a processor executes the print control program 13 including the compensation coefficient determination program as a subprogram, thereby implementing various functions of the print control device 100. However, the configuration is not limited to the configuration using only one CPU 111 as illustrated in FIG. 5. A configuration using a plurality of processors such as a configuration using a plurality of CPUs can also be adopted. As the processor, in addition to the CPU, a micro processing unit (MPU), a graphics processing unit (GPU), a digital signal processor (DSP), or the like can also be adopted. Furthermore, a plurality of types of processors can be used in combination. For example, regarding the components illustrated in FIG. 11, some components and the remaining components may be realized by different processors. Moreover, a configuration including a field-programmable gate array (FPGA) or an application specific integrated circuit (ASIC) can also be adopted.

10. Others

The present invention is not limited to the above embodiment (including the modifications), and various modifications can be made without departing from the gist of the present invention. For example, in the above-described embodiment (including modifications), the inkjet printing apparatus 10 that performs color printing has been adopted. However, the present invention is not limited thereto, and an inkjet printing apparatus that performs monochrome printing may be adopted.

Furthermore, in the above-described embodiment (including modifications), the inkjet printing apparatus 10 using an aqueous ink is adopted. However, the present invention is not limited thereto, and for example, an inkjet printing apparatus using UV ink (ultraviolet curing ink) such as an inkjet printing apparatus for label printing may be adopted. In this case, an ultraviolet irradiation mechanism for curing the UV ink on the printing paper 5 by ultraviolet irradiation is provided inside the printing mechanism 201 (see FIG. 2) instead of the drying mechanism 206. Furthermore, the print medium is not limited to a paper-based medium (print paper), and a film such as oriented polypropylene (OPP) or poly ethylene terephthalate (PET) can also be used. Furthermore, in the above-described embodiment (including the modification), the function representing the curve illustrated in FIG. 17 and the like is generated on the basis of the imaging data (data of luminance values) obtained from the inline scanner 40. However, the unit system of the function representing the curve illustrated in FIG. 17 and the like is not necessarily the luminance value. For example, the configuration may be such that luminance values are converted into density values and a function representing a curve illustrated in FIG. 17 or the like is generated based on the density values.

Note that this application claims priority based on Japanese Patent Application No. 2023-178215 titled "COMPENSATION COEFFICIENT DETERMINATION METHOD, PRINTING METHOD, PRINTING APPARATUS, AND COMPENSATION COEFFICIENT DETERMINATION PROGRAM" filed on Oct. 16, 2023, and the contents of which are incorporated herein by reference.

11. Appendix

The following configurations are also conceivable from the above disclosure.

A printing apparatus including: a plurality of nozzles that ejects ink onto a print medium; an imaging device configured to image a print image; and a control unit configured to control ejection of ink from the plurality of nozzles and imaging of the print image by the imaging device, the printing apparatus performing, at a time of printing, an ink amount compensation process of compensating for an amount of ink ejected onto the print medium when a nozzle in an ejection defect state is present, wherein the control unit executes:

a region setting process of setting a plurality of divided regions including K comparison regions associated with K provisional compensation coefficients different from each other and a normal region that is not affected by a tentative defective nozzle that is virtually considered to be in an ejection defect state, K being an integer of 2 or more;

a tentative defective nozzle setting process of setting the tentative defective nozzle for each of the K comparison regions;

a compensation coefficient calculation chart data generating process of generating compensation coefficient calculation chart data representing a compensation coefficient calculation chart for determining a compensation coefficient by performing the ink amount compensation process on predetermined image data having a constant density while applying the K provisional compensation coefficients to the K comparison regions;

a compensation coefficient calculation chart printing process of controlling ejection of ink from the plurality of nozzles based on the compensation coefficient calculation chart data so that the compensation coefficient calculation chart is printed;

a compensation coefficient calculation chart imaging process of causing the imaging device to image the compensation coefficient calculation chart printed in the compensation coefficient calculation chart printing process;

a data extracting process of extracting, from the imaging data obtained in the compensation coefficient calculation chart imaging process, K pieces of sample image data each including data of one or more luminance values and normal region data that is data of a luminance value corresponding to the normal region, the K pieces of sample image data being data corresponding to the K comparison regions, respectively, and corresponding to a position of the tentative defective nozzle;

a function generating process of generating a function representing a correspondence relationship between coefficient values and luminance differences between a luminance value in the sample image data and a luminance value in the normal region data based on the K pieces of sample image data and the normal region data, the coefficient values including the K provisional compensation coefficients; and of a compensation coefficient calculating process calculating the compensation coefficient using the function generated in the function generating process.

A printing apparatus including: a plurality of nozzles that ejects ink onto a print medium; an imaging device configured to image a print image; and a control unit configured to control ejection of ink from the plurality of nozzles and imaging of the print image by the imaging device, the printing apparatus performing, at a time of printing, an ink amount compensation process of compensating for an amount of ink ejected onto the print medium when a nozzle in an ejection defect state is present, wherein the control unit executes:

a compensation coefficient calculation chart printing process of, to print a compensation coefficient calculation chart for determining a compensation coefficient, controlling ejection of ink from the plurality of nozzles, in a state where a plurality of divided regions including K comparison regions associated with K provisional compensation coefficients different from each other and respectively corresponding to a tentative defective nozzle that is virtually set in an ejection defect state and a normal region that is not affected by the tentative defective nozzle is set, based on compensation coefficient calculation chart data obtained by performing the ink amount compensation process on predetermined image data having a constant density while applying the K provisional compensation coefficients to the K comparison regions, K being an integer of 2 or more;

a compensation coefficient calculation chart imaging process of causing the imaging device to image the compensation coefficient calculation chart printed in the compensation coefficient calculation chart printing process;

a data extracting process of extracting, from the imaging data obtained in the compensation coefficient calculation chart imaging process, K pieces of sample image data each including data of one or more luminance values and normal region data that is data of a luminance value corresponding to the normal region, the K pieces of sample image data being data corresponding to the K comparison regions, respectively, and corresponding to a position of the tentative defective nozzle;

a function generating process of generating a function representing a correspondence relationship between coefficient values and luminance differences between a luminance value in the sample image data and a luminance value in the normal region data based on the K pieces of sample image data and the normal region data, the coefficient values including the K provisional compensation coefficients; and a compensation coefficient calculating process of calculating the compensation coefficient using the function generated in the function generating process.

What is claimed is:

1. A compensation coefficient determination method of determining a compensation coefficient to be applied to an ink amount compensation process that compensates for an amount of ink ejected to a print medium when a nozzle in an ejection defect state is present in a printing apparatus including a plurality of nozzles that ejects ink to the print medium, the compensation coefficient determination method comprising:

setting a plurality of divided regions including K comparison regions associated with K provisional compensation coefficients different from each other and a normal region that is not affected by a tentative defective nozzle that is virtually considered to be in an ejection defect state, K being an integer of 2 or more;

setting the tentative defective nozzle for each of the K comparison regions;

generating compensation coefficient calculation chart data representing a compensation coefficient calculation chart for determining the compensation coefficient by performing the ink amount compensation process on predetermined image data having a constant density while applying the K provisional compensation coefficients to the K comparison regions;

printing the compensation coefficient calculation chart by ejecting ink from the plurality of nozzles based on the compensation coefficient calculation chart data;

acquiring imaging data that is data of a luminance value by imaging the compensation coefficient calculation chart;

extracting, from the imaging data, K pieces of sample image data each including data of one or more luminance values and normal region data that is data of a luminance value corresponding to the normal region, the K pieces of sample image data being data corresponding to the K comparison regions, respectively, and corresponding to a position of the tentative defective nozzle;

generating a function representing a correspondence relationship between coefficient values and luminance differences between a luminance value in the sample image data and a luminance value in the normal region data based on the K pieces of sample image data and the normal region data, the coefficient values including the K provisional compensation coefficients; and calculating the compensation coefficient using the function.

2. The compensation coefficient determination method according to claim 1, wherein the K is an integer of 3 or more, and the function is a nonlinear function.

3. The compensation coefficient determination method according to claim 2, wherein calculating the compensation coefficient includes:

calculating an approximate value of a coefficient value at which the luminance difference is 0 based on the nonlinear function;

extracting, from the K pieces of sample image data, Q pieces of sample image data corresponding to Q provisional compensation coefficients near the approximate value, the Q being an integer of 2 or more;

generating a linear function representing a correspondence relationship between the coefficient values and the luminance differences based on the Q pieces of sample image data and the normal region data; and calculating, as the compensation coefficient, a coefficient value at which the luminance difference is 0 based on the linear function.

4. The compensation coefficient determination method according to claim 1, wherein the K is an integer of 2 or more, and the function is a linear function.

5. The compensation coefficient determination method according to claim 1, wherein in calculating the compensation coefficient, a coefficient value at which the luminance difference is 0 is calculated as the compensation coefficient.

6. The compensation coefficient determination method according to claim 1, wherein in setting the tentative defective nozzle, N tentative defective nozzles are set for each of the K comparison regions, N being an integer of 2 or more, and each of the K sample image data includes data of N luminance values corresponding to positions of the N tentative defective nozzles.

7. The compensation coefficient determination method according to claim 1, wherein the compensation coefficient calculation chart includes J sheets for each color of ink, J being an integer of 2 or more, and each of the K pieces of sample image data includes data of J luminance values corresponding to the J sheets.

8. The compensation coefficient determination method according to claim 1, wherein in setting the tentative according to claim 1, defective nozzle, N tentative defective nozzles are set for each of the K comparison regions, N being an integer of 2 or more, the compensation coefficient calculation chart includes J sheets for each color of ink, J being an integer of 2 or more, and each of the K sample image data includes data of (N×J) luminance values corresponding to all combinations of the N tentative defective nozzles and the J sheets.

9. The compensation coefficient determination method according to claim 1, wherein in setting a plurality of divided regions, the plurality of divided regions is set such that the K comparison regions are arranged in a direction orthogonal to a conveyance direction of the print medium.

10. The compensation coefficient determination method according to claim 1, wherein in setting a plurality of divided regions, the plurality of divided regions is set such that the K comparison regions are arranged in a conveyance direction of the print medium.

11. The compensation coefficient determination method according to claim 1, wherein the compensation coefficient calculation chart includes M density regions corresponding to M densities different from each other in a conveyance direction of the print medium, M being an integer of 2 or more, in generating a function, the function is generated for each density, and in calculating the compensation coefficient, the compensation coefficient is calculated for each density using a corresponding function.

12. The compensation coefficient determination method according to claim 1, further comprising:

printing an ejection defect detection chart for detecting a nozzle in an ejection defect state by ejecting ink from the plurality of nozzles;

imaging the ejection defect detection chart;

detecting a nozzle in an ejection defect state based on imaging data obtained in imaging the ejection defect detection chart; and deleting data of a luminance value corresponding to a position of a true defective nozzle that is a nozzle detected in detecting a nozzle in an ejection defect state from the K pieces of sample image data, and in generating a function, the K pieces of sample image data after data of a luminance value corresponding to a position of the true defective nozzle is deleted in deleting data.

13. A printing method using a printing apparatus including a plurality of nozzles that ejects ink to a print medium, the printing method comprising:

determining a compensation coefficient to be applied to an ink amount compensation process that compensates for an amount of ink ejected to the print medium when a nozzle in an ejection defect state is present in the printing apparatus;

generating step of generating shading data to be used in a shading correction process that compensates for variation in an ejection amount of ink among the plurality of nozzles;

correcting step of correcting the shading data by performing the ink amount compensation process on the shading data using the compensation coefficient;

generating print data by performing a rasterization process on submission data;

correcting the print data by performing the shading correction process on the print data using corrected shading data;

generating halftone image data by performing a halftone process on corrected print data; and ejecting ink from the plurality of nozzles based on the halftone image data, wherein determining a compensation coefficient includes:

setting a plurality of divided regions including K comparison regions associated with K provisional compensation coefficients different from each other and a normal region that is not affected by a tentative defective nozzle that is virtually considered to be in an ejection defect state, K being an integer of 2 or more;

setting the tentative defective nozzle for each of the K comparison regions;

generating compensation coefficient calculation chart data representing a compensation coefficient calculation chart for determining the compensation coefficient by performing the ink amount compensation process on predetermined image data having a constant density while applying the K provisional compensation coefficients to the K comparison regions;

printing the compensation coefficient calculation chart by ejecting ink from the plurality of nozzles based on the compensation coefficient calculation chart data;

acquiring imaging data that is data of a luminance value by imaging the compensation coefficient calculation chart;

extracting, from the imaging data, K pieces of sample image data each including data of one or more luminance values and normal region data that is data of a luminance value corresponding to the normal region, the K pieces of sample image data being data corresponding to the K comparison regions, respectively, and corresponding to a position of the tentative defective nozzle;

generating a function representing a correspondence relationship between coefficient values and luminance differences between a luminance value in the sample image data and a luminance value in the normal region data based on the K pieces of sample image data and the normal region data, the coefficient values including the K provisional compensation coefficients; and calculating the compensation coefficient using the function.

14. A compensation coefficient determination method of determining a compensation coefficient to be applied to an ink amount compensation process that compensates for an amount of ink ejected to a print medium when a nozzle in an ejection defect state is present in a printing apparatus including a plurality of nozzles that ejects ink to the print medium, the compensation coefficient determination method comprising:

printing a compensation coefficient calculation chart for determining the compensation coefficient by ejecting ink from the plurality of nozzles, in a state where a plurality of divided regions including K comparison regions associated with K provisional compensation coefficients different from each other and respectively corresponding to a tentative defective nozzle that is virtually set in an ejection defect state and a normal region that is not affected by the tentative defective nozzle is set, based on compensation coefficient calculation chart data obtained by performing the ink amount compensation process on predetermined image data having a constant density while applying the K provisional compensation coefficients to the K comparison regions, K being an integer of 2 or more;

acquiring imaging data that is data of a luminance value by imaging the compensation coefficient calculation chart;

extracting, from the imaging data, K pieces of sample image data each including data of one or more luminance values and normal region data that is data of a luminance value corresponding to the normal region, the K pieces of sample image data being data corresponding to the K comparison regions, respectively, and corresponding to a position of the tentative defective nozzle;

generating a function representing a correspondence relationship between coefficient values and luminance differences between a luminance value in the sample image data and a luminance value in the normal region data based on the K pieces of sample image data and the normal region data, the coefficient values including the K provisional compensation 10 coefficients; and calculating the compensation coefficient using the function.

* * * * *